(12) United States Patent  (10) Patent No.: US 7,316,616 B2
Oberberger  (45) Date of Patent: Jan. 8, 2008

(54) GAMING SYSTEM LICENSE MANAGEMENT

(75) Inventor: Mike Oberberger, Reno, NV (US)

(73) Assignee: IGT, Reno, NV (US)

( * ) Notice: Subject to any disclaimer, the term of this patent is extended or adjusted under 35 U.S.C. 154(b) by 520 days.

(21) Appl. No.: 10/050,747

(22) Filed: Jan. 16, 2002

(65) Prior Publication Data

US 2003/0134675 A1 Jul. 17, 2003

(51) Int. Cl.
*A63F 9/24* (2006.01)
*A63F 13/00* (2006.01)
*G06F 17/00* (2006.01)
*G06F 19/00* (2006.01)
*H04K 1/00* (2006.01)

(52) U.S. Cl. ................... 463/29; 463/40; 463/42; 463/43; 380/251; 380/255

(58) Field of Classification Search ............... 463/29, 463/1, 16, 22, 25, 40–43; 380/1, 2, 28–30, 380/44–46, 59, 251, 255, 258, 259, 264, 380/265, 277–279, 282
See application file for complete search history.

(56) References Cited

U.S. PATENT DOCUMENTS

| 3,931,504 | A |   | 1/1976  | Jacoby ................... 235/153 |
|-----------|---|---|---------|-----------------------------------|
| 4,430,728 | A |   | 2/1984  | Beitel et al. ............. 364/900 |
| 4,454,594 | A |   | 6/1984  | Heffron et al. ............ 364/900 |
| 5,343,527 | A |   | 8/1994  | Moore ........................ 380/4 |
| 5,605,506 | A |   | 2/1997  | Hoorn et al. ............... 463/47 |
| 5,643,086 | A | * | 7/1997  | Alcorn et al. ............... 463/29 |
| 5,671,412 | A |   | 9/1997  | Christiano .............. 707/104.1 |
| 5,715,403 | A |   | 2/1998  | Stefik ...................... 705/44 |
| 5,754,763 | A | * | 5/1998  | Bereiter .................... 726/28 |
| 5,762,552 | A |   | 6/1998  | Vuong et al. ............... 463/25 |
| 5,766,075 | A |   | 6/1998  | Cook et al. ................. 463/25 |
| 5,768,382 | A |   | 6/1998  | Schneier et al. ............ 380/23 |
| 5,836,817 | A |   | 11/1998 | Acres et al. ................ 463/26 |
| 5,851,149 | A |   | 12/1998 | Xidos et al. ................ 463/42 |

(Continued)

FOREIGN PATENT DOCUMENTS

EP 0715245 5/1996

(Continued)

OTHER PUBLICATIONS

International Search Report for PCT/US02/09238 completed Sep. 24, 2002.

(Continued)

*Primary Examiner*—Robert E. Pezzuto
*Assistant Examiner*—Binh-An D. Nguyen
(74) *Attorney, Agent, or Firm*—Beyer Weaver LLP

(57) ABSTRACT

A gaming system may include a first gaming unit, a second gaming unit, and a monitoring apparatus operatively coupled to the first and second gaming unit. The monitoring apparatus may include a display terminal and a monitoring apparatus controller operatively coupled to the display terminal. The monitoring apparatus controller may comprise a processor and a memory having encrypted license data representing a license parameter and a corresponding license parameter value stored therein, and may be programed to determine if the encrypted license data is authentic and may be programmed to determine if a configuration of the gaming system is in compliance with the license parameter value of the license parameter.

39 Claims, 17 Drawing Sheets

U.S. PATENT DOCUMENTS

| | | | |
|---|---|---|---|
| 5,925,127 A | 7/1999 | Ahmad | 713/200 |
| 5,970,143 A | 10/1999 | Schneier et al. | 713/181 |
| 5,999,808 A | 12/1999 | LaDue | 455/412.2 |
| 6,002,772 A | 12/1999 | Saito | 705/58 |
| 6,015,346 A | 1/2000 | Bennett | 463/20 |
| 6,052,512 A | 4/2000 | Peterson et al. | 709/220 |
| 6,099,408 A | 8/2000 | Schneier et al. | 463/29 |
| 6,102,799 A | 8/2000 | Stupak | 463/27 |
| 6,104,815 A | 8/2000 | Alcorn et al. | 380/251 |
| 6,106,396 A | 8/2000 | Alcorn et al. | 463/29 |
| 6,125,185 A | 9/2000 | Boesch | 380/285 |
| 6,149,522 A | 11/2000 | Alcorn et al. | 463/29 |
| 6,165,072 A | 12/2000 | Davis et al. | 463/29 |
| 6,169,976 B1 | 1/2001 | Colosso | 705/59 |
| 6,178,510 B1 | 1/2001 | O'Connor et al. | 713/201 |
| 6,189,146 B1* | 2/2001 | Misra et al. | 717/177 |
| 6,251,013 B1 | 6/2001 | Bennet | 463/13 |
| 6,253,374 B1 | 6/2001 | Dresevic et al. | 717/11 |
| 6,261,178 B1 | 7/2001 | Bennett | 463/20 |
| 6,264,561 B1* | 7/2001 | Saffari et al. | 463/42 |
| 6,285,868 B1 | 9/2001 | LaDue | 455/410 |
| 6,302,793 B1 | 10/2001 | Fertitta, III et al. | 463/25 |
| 6,364,769 B1 | 4/2002 | Weiss et al. | 463/29 |
| 6,368,219 B1 | 4/2002 | Szrek et al. | 463/42 |
| 6,446,257 B1 | 9/2002 | Pradhan et al. | 717/154 |
| 6,449,687 B1 | 9/2002 | Moriya | 711/112 |
| 6,453,319 B1 | 9/2002 | Mattis et al. | 707/100 |
| 6,454,648 B1 | 9/2002 | Kelly et al. | 463/16 |
| 6,508,709 B1 | 1/2003 | Karmarkar | 463/43 |
| 6,595,856 B1* | 7/2003 | Ginsburg et al. | 463/29 |
| 6,728,748 B1* | 4/2004 | Mangipudi et al. | 718/105 |
| 2002/0045477 A1 | 4/2002 | Dabrowski | 463/29 |
| 2002/0049909 A1* | 4/2002 | Jackson et al. | 713/188 |
| 2002/0071557 A1* | 6/2002 | Nguyen | 380/251 |
| 2002/0178387 A1* | 11/2002 | Theron | 713/300 |
| 2003/0014639 A1* | 1/2003 | Jackson et al. | 713/181 |

FOREIGN PATENT DOCUMENTS

| | | |
|---|---|---|
| EP | 0744786 | 11/1996 |
| EP | 0 997 173 | 5/2000 |
| EP | 1061430 A1 | 12/2000 |
| EP | 1074955 A2 | 2/2001 |
| EP | 1 130 555 | 3/2001 |
| WO | 95/24689 | 9/1995 |
| WO | 96/00950 | 11/1996 |
| WO | WO 00/33196 | 11/1998 |
| WO | 99/01188 | 1/1999 |
| WO | WO 01/50230 | 7/2001 |
| WO | WO 01/67218 | 9/2001 |
| WO | 02/05229 A2 | 1/2002 |

OTHER PUBLICATIONS

"Secure Hash Standard," *Federal Information Processing Standards*, Publication 180-1, Apr. 17, 1995.

"Communication Pursuant to Article 96(2) EPC," dated Dec. 7, 2004 and issued in connection with EPO Appl. No. 02 709 880.5 assigned to IGT, which is the EPO counterpart of the present application, 5 pages.

U.S. Appl. No. 09/520,404 (30 pages).

* cited by examiner

FIG. 14
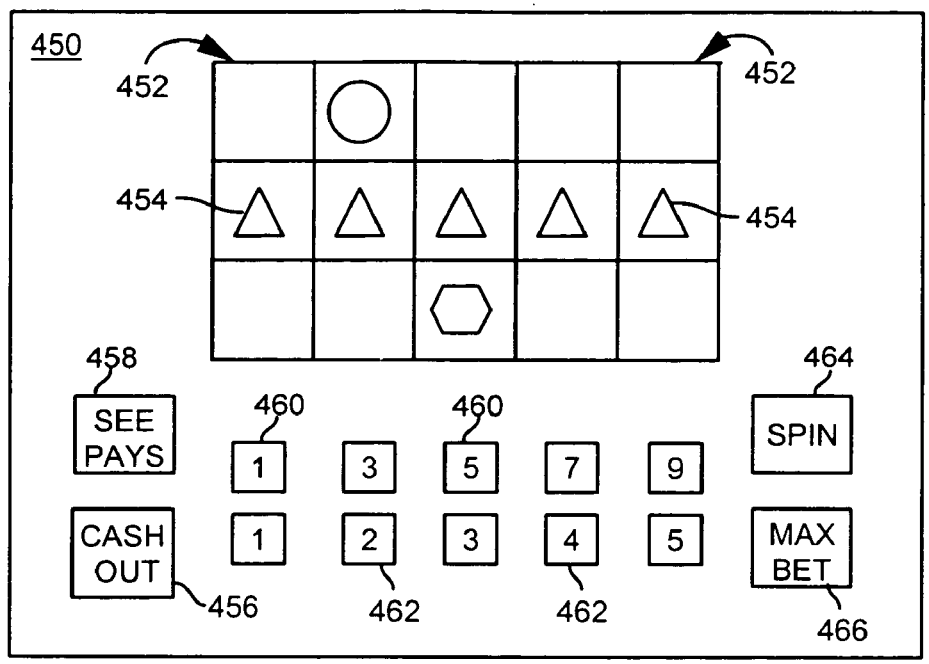
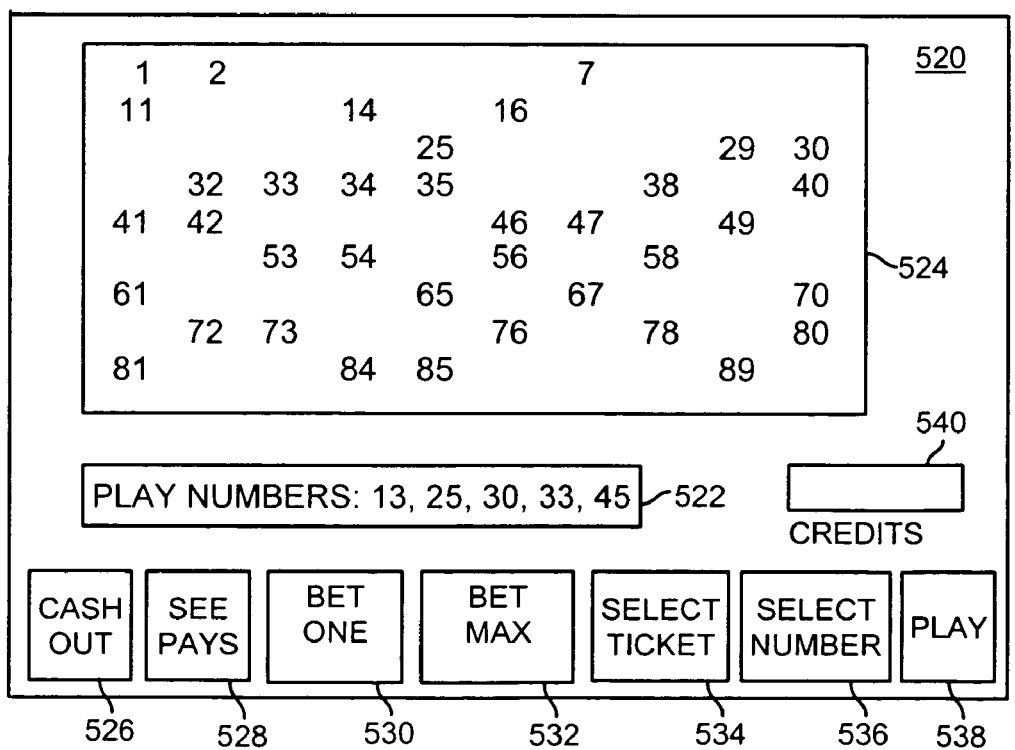
FIG. 15

GAMING SYSTEM LICENSE MANAGEMENT

BACKGROUND OF THE INVENTION

The present invention is directed to a monitoring apparatus, which could monitor either an individual gaming unit or a gaming system having a plurality of gaming units, that is capable of determining whether the gaming system or individual gaming unit is configured in compliance with license parameter values of a license.

A conventional gaming system has been provided with numerous gaming units, one or more ticket validation units, one or more cashier stations, one or more auditor stations, a front end processor, and one or more workstations. The gaming units have been provided with a display unit that is capable of generating video images, a coin or bill acceptor, and a controller with a memory and a processor that controls the overall operation of the gaming unit. The controller was programmed to allow a person to make a wager, to cause video images to be generated on the display unit, to determine an outcome of the video gambling game, and to determine a value payout associated with the outcome of the video gambling game. The conventional gaming unit was programmed to display video images representing a video gambling game, which included a number of user-selectable video gambling games including video poker, video blackjack, video slots, video keno and video bingo.

SUMMARY OF THE INVENTION

In one aspect, the invention is directed to a gaming system that may include a first gaming unit, a second gaming unit, and a monitoring apparatus operatively coupled to the first and second gaming units, the monitoring apparatus having a memory for storing having encrypted license data representing a license parameter and a corresponding license parameter value stored therein and a processor operatively coupled to the memory of the monitoring apparatus controller. The monitoring apparatus controller may be programmed to determine if the encrypted license data is authentic, and may be programmed to determine if a configuration of the gaming system is in compliance with the license parameter value of the license parameter.

The encrypted license data may be formed from a first hash value and license signature data. The license signature data includes data generated by application of a private key from a private/public key pair to the first hash value, and the first hash value includes data generated by application of a hashing algorithm to the license parameter.

The first and second gaming units may include a display unit capable of generating video images, a value input device, and a gaming unit controller operatively coupled to the display unit and the value input device. The gaming unit controller may comprise a processor and a memory and may be programmed to allow a person to make a wager, to cause a video image representing a game to be generated on the display unit, to determine an outcome of the video gambling game and a value payout associated with the outcome of the video gambling game.

The video image may represent numerous games including, for example, video poker, video blackjack, video slots, video keno and video bingo. The video image may be an image of at least five playing cards if the game is video poker, or the video image may be an image of a group of simulated slot machine reels if the game is video slots. The video image may also be a group of playing cards if the game is video blackjack, or the video image may be an image of a group of keno numbers if the video gambling game is video keno. Similarly, the video image may comprise an image of a bingo grid if the video gambling game is video bingo.

The monitoring apparatus controller may be programmed to determine if the license is authentic by separating the license signature data from the first hash value, applying the hashing algorithm to the hash value to form a second hash value, the second hash value representative of the license parameter, applying a public key from the private/public key pair to the license signature to form a third hash value, and determining that the license is authentic if the second hash value is about equal to the third hash value.

The monitoring apparatus controller may also be programmed to determine licensee compliance with the license parameters by extracting the license parameter value of the license parameter from the encrypted license data, comparing the license parameter value to a real-time parameter value corresponding to the license parameter, the real-time parameter value corresponding to an actual gaming system configuration value of the gaming system, and determining that the gaming system is in compliance with the license parameter value of the license parameter if the real-time parameter value does not exceed the license parameter value.

In addition, the monitoring apparatus controller is programmed to prevent an operator/licensee from reconfiguring the configuration of the gaining system when the encrypted license data is determined to be invalid. The monitoring apparatus controller is also programmed to prevent an operator from reconfiguring a portion of the gaming system when the portion of the gaming system is not in compliance with the license parameter value of the license parameter.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

FIG. 14 is an illustration of an embodiment of a visual display that may be displayed during performance of the slots routine of FIG. 16;

FIG. 15 is an illustration of an embodiment of a visual display that may be displayed during performance of the video keno routine of FIG. 17;

DETAILED DESCRIPTION OF VARIOUS EMBODIMENTS

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, it is not intended that the scope of any claim element be interpreted based on the application of 35 U.S.C. §112, sixth paragraph.

Figure 1:
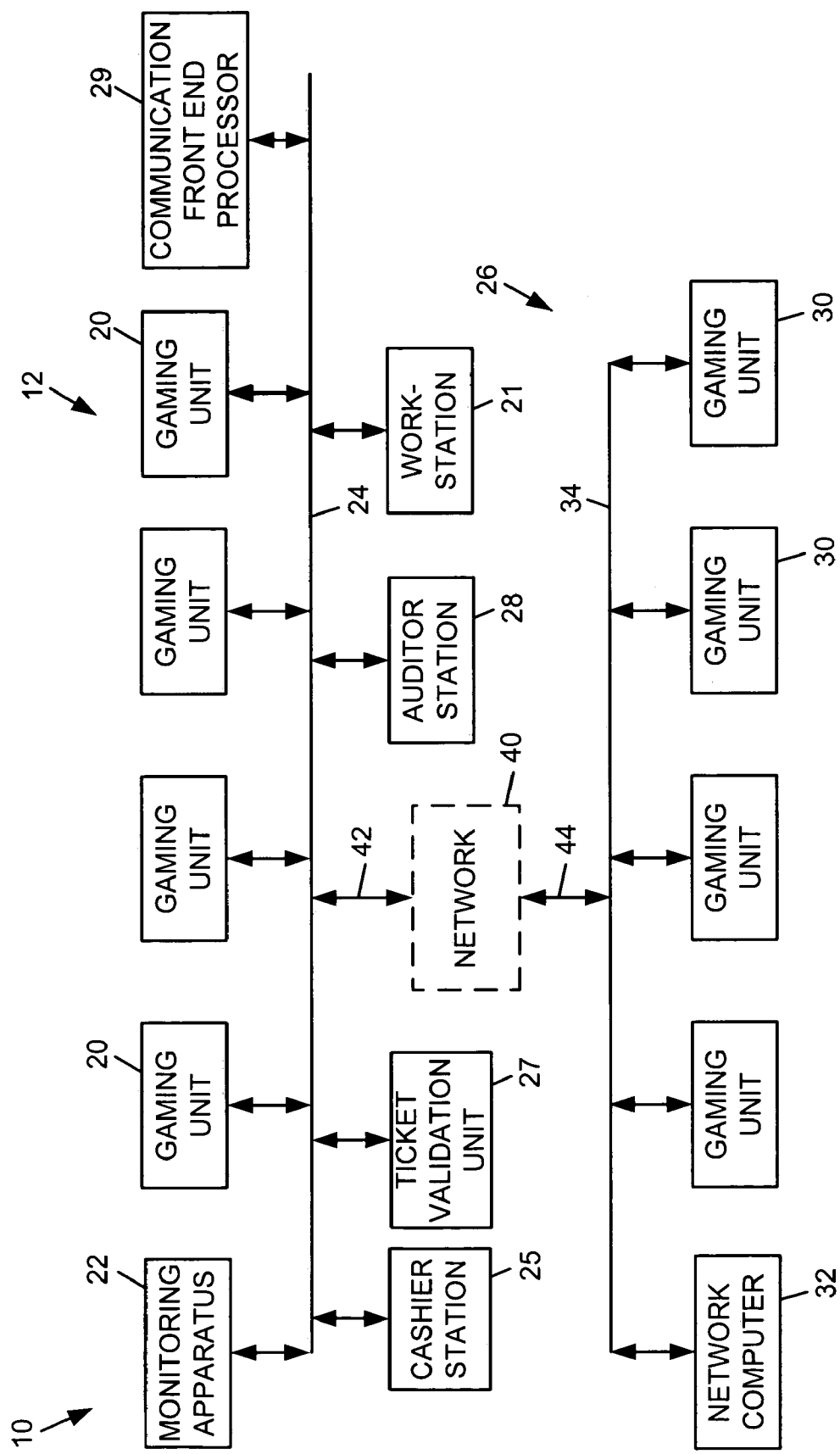
FIG. 1 is a block diagram of an embodiment of a gaming system in accordance with the invention.

FIG. 1 illustrates an embodiment of a casino gaming system 10 in accordance with the invention. Referring to FIG. 1, the casino gaming system 10 may include a first group or network 12 of casino gaming units 20, one or more ticket validation unit(s) 27, one or more cashier station(s) 25, one or more auditor station(s) 28, a front end processor 29, and one or more workstation(s) 21 operatively coupled to a monitoring apparatus 22 via a network data link or bus 24. The casino gaming system 10 may include a second group or network 26 of casino gaming units 30 operatively coupled to a network computer 32 via a network data link or bus 34. The first and second gaming networks 12, 26 may be operatively coupled to each other via a network 40, which may comprise, for example, the Internet, a wide area network (WAN), or a local area network (LAN) via a first network link 42 and a second network link 44.

The first network 12 of gaming units 20 may be provided in a first casino, and the second network 26 of gaming units 30 may be provided in a second casino located in a separate geographic location than the first casino. For example, the two casinos may be located in different areas of the same city, or they may be located in different states. The network 40 may include a plurality of network computers or server computers (not shown), each of which may be operatively interconnected. Where the network 40 comprises the Internet, data communication may take place over the communication links 42, 44 via an Internet communication protocol.

A typical gaming system configuration may include hundreds of gaming units as well as numerous other elements. For example, a gaming system may include 500 gaming units, 1 communication front end processor, 10 workstations, 5 cashiers, 3 auditors, and 7 ticket validation units. In order to manage the gaming system, a monitoring apparatus such as monitoring apparatus 22, may be required. A license, provided by a licensor, for example International Game Technology (IGT), to a licensee gaming operator, for example a casino, may be created to provide operational of functional configuration limitations, or parameters, for monitoring of the gaming system.

For example, the monitoring apparatus 22 may monitor the gaming system 10, composed of the first network 12 and/or the second network 26, to ensure operational and/or physical compliance with a number of license parameter values described in the license. The license, issued to the gaming system operator, may be formed from encrypted license data and provide license parameter values for selected operational and/or physical parameters of the gaming system 10. For example, the monitoring apparatus 22 may monitor the gaming system 10 to ensure physical configuration compliance to a maximum number of gaming machines allowed by the license. Similarly, the monitoring apparatus 22 may monitor the gaining system 10 to ensure operational configuration compliance to a maximum number and type of reports that may be generated each day, or to ensure valid gaming system operational modes allowed by the license, etc. Accordingly, the monitoring apparatus 22 may be configured as a server computer to monitor data relating to the licensed operational and physical parameters of gaming system 10.

The network computer 32 may be a server computer capable of accumulating and analyzing data relating to the operation of gaming units 20, 30. For example, the network computer 32 may continuously receive data from each of the gaming units 20, 30, indicative of the dollar amount and number of wagers being made on each of the gaming units 20,30, data indicative of how much each of the gaming units 20, 30, is paying out in winnings, data regarding the identity and gaming habits of players playing each of the gaming units 20, 30, etc.

Although networks 12, 26 is shown to include one network computer 32 and eight gaming units 20, 30, it should be understood that different numbers of computers and gaming units may be utilized. For example, the network 12 may include one or more network computers and tens or hundreds of gaming units 20, all of which may be interconnected via the data link 24. The data link 24 may be provided as a dedicated hardwired link or a wireless link. Although the data link 24 is shown as a single data link 24, the data link 24 may comprise multiple data links.

Figure 2:
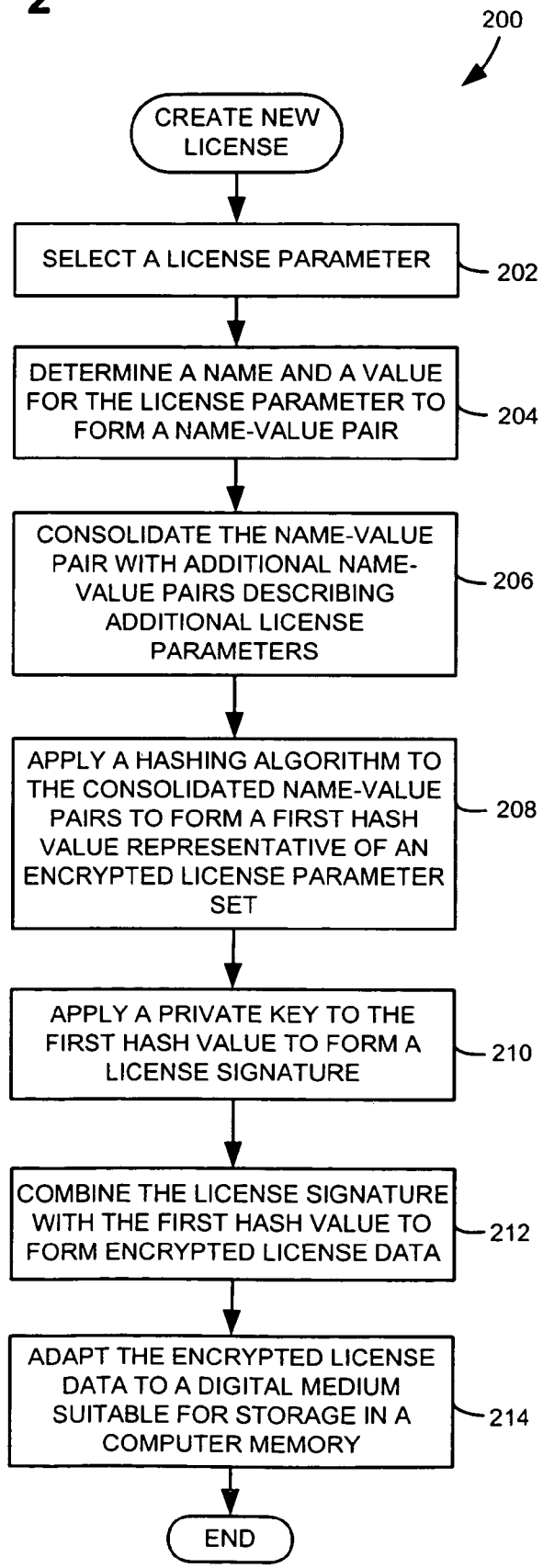
FIG. 2 is a flowchart of an embodiment of a license creation routine that may be performed during the generation of a new license for the gaming system of FIG. 1.

FIG. 2 is a flowchart of an embodiment of a license creation routine 200 that may be performed when generating a new license for a gaming system configuration such as the configuration of gaming system 10. The license creation routine 200 may be performed using a suitable computer system, under the control of the licensor. Referring to FIG. 2, the license creation routine 200 may begin operation at block 202 where one or more license parameters are selected. The license parameters may be selected from any number of physical functions of the gaming system 10 and may include, for example, the maximum number of the gaming units 20 that the monitoring apparatus 22 may monitor, and/or the maximum number of work stations 21 that may be connected to gaming system 10, etc. The license parameters may also be selected from any number of operational functions of the gaming system 10 and may include, for example, the gaming system site name, the gaming system site identification number, the expiration date of the license, the permissible operating modes for gaming system 10 such as stand-alone mode versus master-slave mode, the number and type of reports that may be run on the gaming system 10, etc. Each of the one or more parameters is assigned a name-value pair at block 204. In one embodiment, the name-value pair may exist in a non-hierarchy, flat structure while in another embodiment, the name-value pair may exist in a hierarchy, tree-like structure. The "name" of each pair is typically a standard string of characters generally recognizable by a human reader. For example, a name may be a "Site Name", a "Max Machine Count". The "value" of each pair may be anything that is appropriate to selected parameter. Typically, there are two primary data types used to describe the "value" including a string and an integer. For example, if "Site Name" is selected for the "name", the "value" may contain a string indicating the owner of the gaming system. If "Max Machine Count" is selected for the "name" the "value" may contain an integer such as 500. The strings may be encoded as ASCII, Unicode, UTF-16, or any other industry standard or proprietary encoding scheme.

Each name-value pair representing one licence parameter is consolidated with additional name-value pairs representative of additional license parameters, at block 206. A hashing algorithm, or mathematical function used for encryption, is then applied to the consolidated set of name-value pairs at block 208. Application of a hashing algorithm to the consolidated set of name-value pairs results in a computation of a first hash value. The hashing algorithm may be any hashing algorithm such as the MD5 hashing algorithm from RSA Data Security, Inc. (RSA, Inc.), headquartered in Bedford, Mass., suitable for use in encrypting and decrypting. Next, a license signature is derived at block 210 by applying a private key from a public-private key pair to the first hash value. The license signature, generated when the licensor's private key is applied to the first hash value, is representative of the licensors's digital signature. The private key, for example RSA-KEYX manufactured by RSA, Inc., preferably utilizes an asymmetric algorithm. The license signature derived at block 210 is then added to the first hash value at block 212 to form an encrypted license data set, or license, representative of the one or more license parameters and their corresponding license parameter values. The license creation routine 200 is completed at block 214 where the encrypted license data is adapted to a digital medium suitable for storage in a computer memory, such as the program memory 92 and/or the RAM 94 of monitoring apparatus controller 97.

Utilization of a public-private key pair enables application of cryptography techniques to gaming system licenses. As the sole holder of the private key of a public-private key, the licensor has the power to generate the license signature and thus create the license. As one of many holders of the public key from the public-private key pair, the licensee has only the power to verify the authenticity of the license signature.

Monitoring Apparatus Electronics

Figure 3:
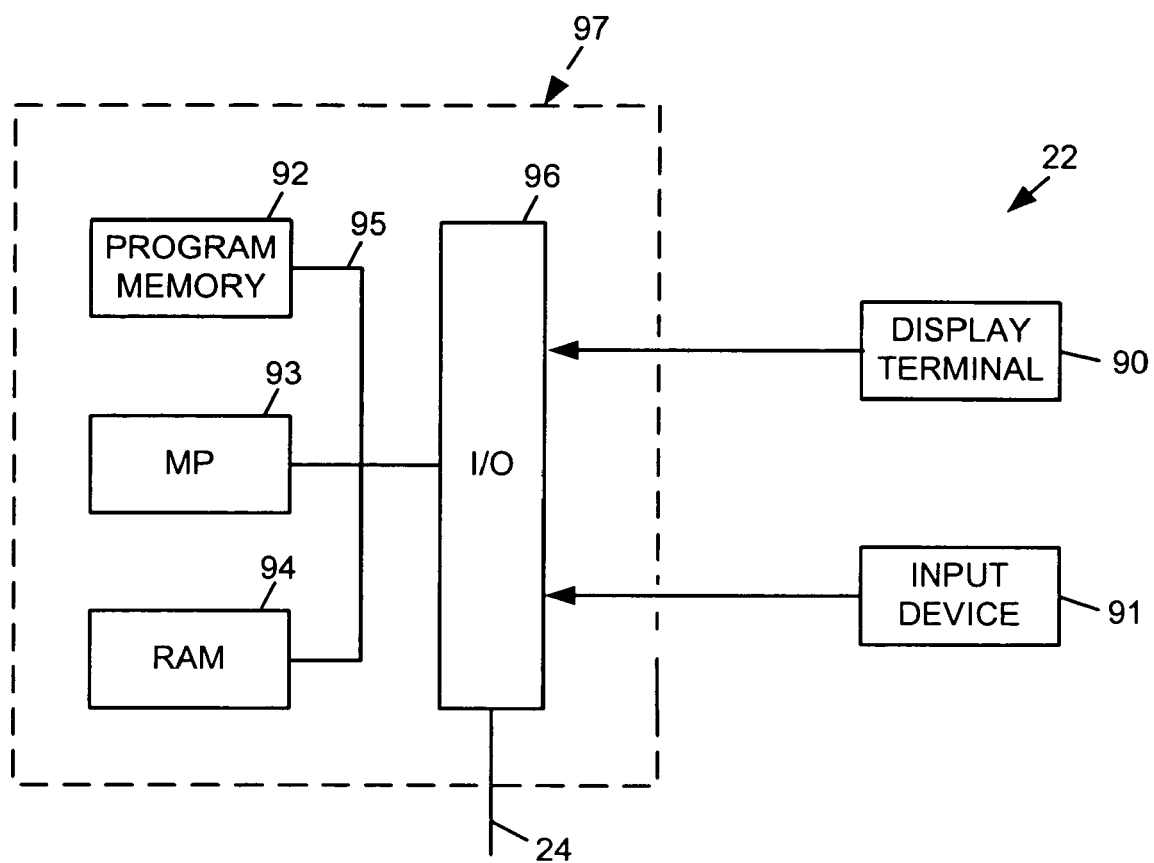
FIG. 3 is a block diagram of the electronic components of the monitoring apparatus of FIG. 1.

FIG. 3 is a block diagram of a number of components that may be incorporated in the monitoring apparatus 22. Referring to FIG. 3, the monitoring apparatus 22 may include a monitoring apparatus controller 97 that may comprise a program memory 92, a microcontroller or microprocessor (MP) 93, a random-access memory (RAM) 94 and an input/output (I/O) circuit 96, all of which may be interconnected via an address/data bus 95. It should be appreciated that although only one microprocessor 93 is shown, the monitoring apparatus controller 97 may include multiple microprocessors 93. Similarly, the memory of the monitoring apparatus controller 97 may include multiple RAM(s) 94 and multiple program memories 92. Although the I/O circuit 96 is shown as a single block, it should be appreciated that the I/O circuit 96 may include a number of different types of I/O circuits. The RAM(s) 94 and program memories 92 may be implemented as semiconductor memories, magnetically readable memories, and/or optically readable memories, for example.

FIG. 3 illustrates that a display terminal 90, and an input device 91 may be operatively coupled to the I/O circuit 96 by either a unidirectional or bidirectional, single-line or multiple-line data link, which may depend on the design of the component that is used. The display terminal 90 and the input device 91 may be connected to the I/O circuit 96 via a respective direct line or conductor. Different connection schemes could be used. For example, display terminal 90 may be connected to the I/O circuit 96 via a common bus or other data link that is shared by a number of components. Furthermore, the display terminal 90 and the input device 91 may be directly connected to the microprocessor 93 without passing through the I/O circuit 96.

The license, formed from encrypted license data (discussed in connection with FIG. 2), describes a number of license parameter values for licensed parameters for gaming system 10. For example, one licensed parameter may correspond to the number of gaming units configured in gaming system 10, and its license parameter value may be 500, indicating that the licensed configuration of gaming system 10 can support up to 500 gaming units. Additional gaming units above 500 may only be added to gaming system 10 if the license is revised.

A gaming system operator or the licensor may access the license, stored in the RAM 94 or the program memory 92 of the monitoring apparatus controller 97, via the input device 91 in order to verify that the license is authentic (discussed in connection to FIG. 4). Similarly, the gaming system operator or the licensor may access the license via the input device 91 in order to determine configuration compliance of gaming system 10 to one or more parameter values set forth in the license (discussed in connection to FIG. 5). In both instances, a license application program interface (API), also stored in the RAM 94 or the program memory 92 of the monitoring apparatus controller 97, may be invoked to allow access to the license. In addition, the display terminal 90 may display messages associated with the operation of the monitoring device 22. For example, if the monitoring apparatus controller 97 determines that the license is not authentic, a message indicating an invalid license may be displayed on the display terminal 90. Similarly, if the monitoring apparatus controller 97 determines that a gaming system parameter value is not in compliance with its corresponding license parameter value, a message indicating that the license parameter(s) has been exceeded may be displayed on display terminal 90.

Overall Operation of Gaming System

One manner in which the monitoring apparatus 22 of gaming system 10 may operate is described in connection with a number flowcharts which represent a number of portions or routines of one or more computer programs, which may be stored in one or more of the memories of the monitoring apparatus controller 97. The computer program (s) or portions thereof may be stored remotely, outside of the monitoring apparatus 22, and may control the operation of the gaming system 10 from a remote location. Such remote control may be facilitated with the use of a wireless connection, or by an Internet interface that connects the monitoring apparatus 22 with a remote computer (such as the network computer 32) having a memory in which the computer program portions are stored. The computer program portions may be written in any high level language such as C, C+, C++ or the like or any low-level, assembly or machine language. By storing the computer program portions therein, various portions of the memories 92, 94 are physically and/or structurally configured in accordance with computer program instructions.

Figure 4:
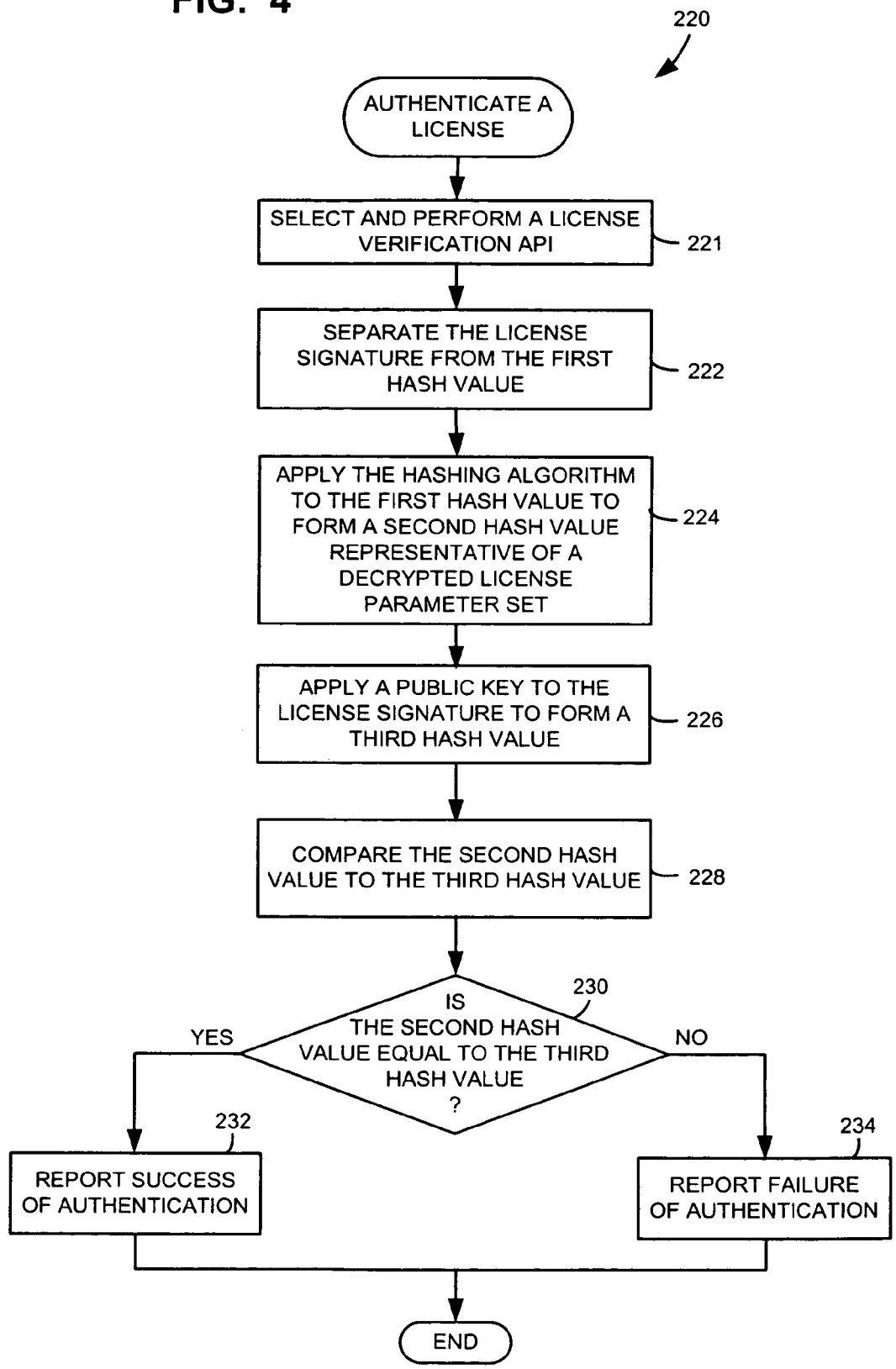
FIG. 4 is a flowchart of an embodiment of a license authentication routine that may be performed during the authentication of a license for the gaming system of FIG. 1.

FIG. 4 is a flowchart of an embodiment of a license authentication routine 220 that may be stored in the memory of monitoring apparatus controller 97. The license authentication routine may be performed when authenticating a license such as the license stored in the memory of monitoring apparatus controller 97. Typically, a license is considered to be authentic when the license signature, generated by the licensor during the creation of the license, is determined to be valid and not the result of a forgery or an error. Referring to FIG. 4, the license authentication routine 220 may begin operation at block 221 where a license verification API may be selected by an operator via input device, for example the input device 91 described in connection with FIG. 3. Selection of the license verification API allows operator access to the license if the operator has the proper private-public key. After the license is accessed, the license signature is separated from the first hash value at block 222. The separation is accomplished by treating the license signature as a reserve parameter and not including it in the hash. The hashing algorithm, previously used to create the license, is applied to the first hash value at block 224. The resulting computation, or second hash value. is representative of a decrypted license data set of the license parameters and their corresponding license parameter values. A third hash value is formed at block 226 when a public key from the private-public key pair is applied to the license signature. A comparison of the second hash value to the third hash value at block 228 is then used to determine if the license is authentic. If the second hash value is equal to the third hash value at block 230, then a determination that the license is authentic is reported at block 232 to the operator via a display terminal such as display terminal 90. If the second hash value is not equal to the third hash value at block 230, then a determination that the license is not authentic is reported at block 234 to the operator via a display such as display terminal 90. In addition, if the license is determined to be not authentic, the monitoring apparatus controller 97 may prevent the operator/licensee from reconfiguring any of the physical or operational configurations sought to be controlled by the license until such time as an authentic license is obtained.

Figure 5:
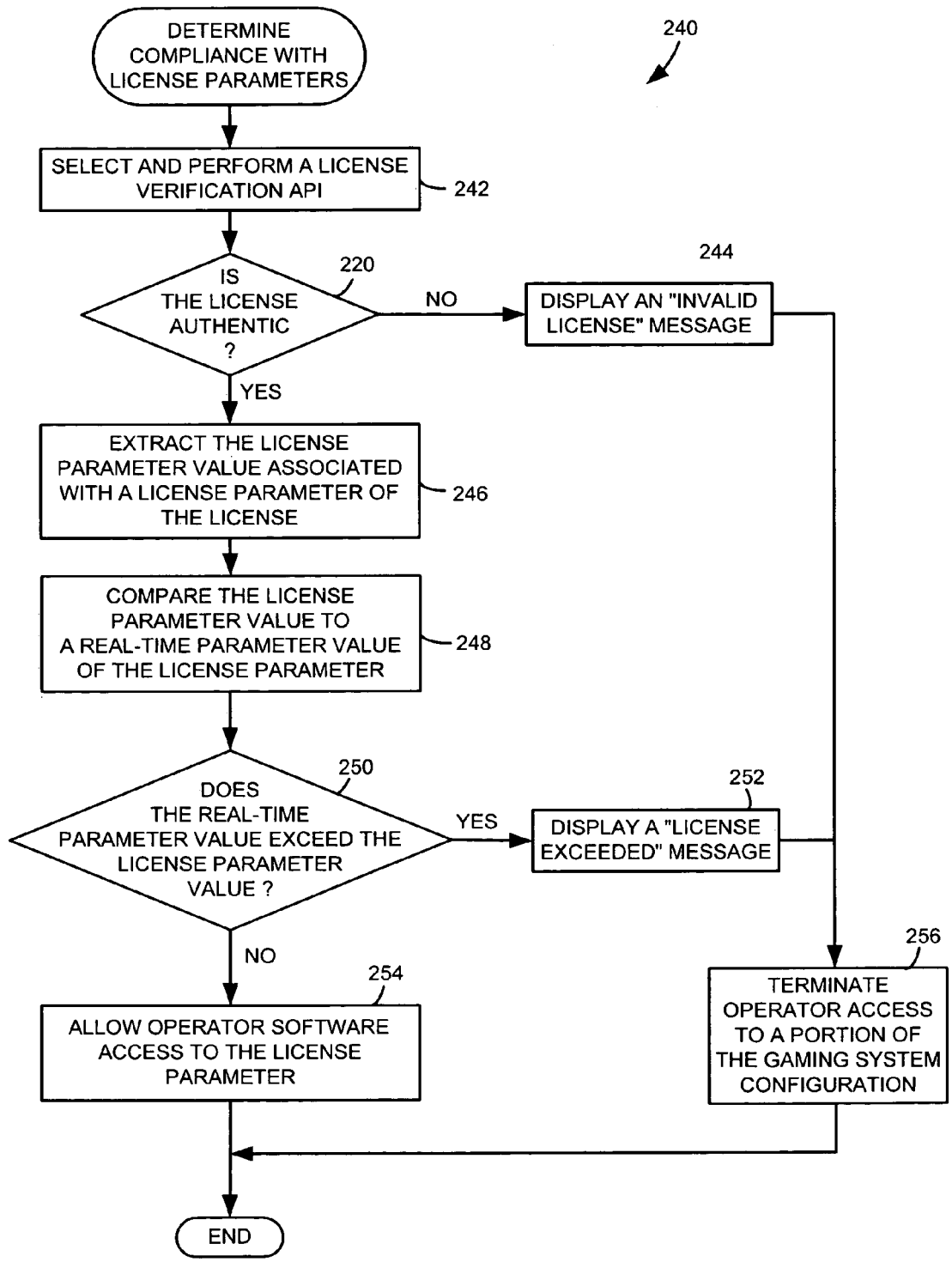
FIG. 5 is a flowchart of an embodiment of a license compliance routine that may be performed to ensure physical or operational configuration compliance of the gaming system shown in FIG. 1 with the license of FIG. 2.

FIG. 5 is a flowchart of an embodiment of a license compliance routine 240 that may be stored in the monitor apparatus controller 97. The license compliance routine 240 may be performed to ensure physical or operational configuration compliance of gaming system 10 with one of the license parameter values sought to be controlled by the license. Referring to FIG. 5, the license compliance routine 240 may begin operation at block 242 during which a license verification application program interface (API) may be selected by an operator via input device of monitoring apparatus 22, for example the input device 91 described in connection with FIG. 3. Once selected, the license verification API allows the license authentication routine 220 described above to make a determination of license authenticity at block 220. If the license is determined to be non-authentic, a message indicating its non-authenticity, for example a "invalid license" message may be displayed on display terminal 90. In addition, the monitoring apparatus controller 97 may prevent the operator/licensee from reconfiguring any of the physical or operational configurations sought to be controlled by the license. If the license is determined to be authentic, a message indicating its authenticity, for example a "valid license" message may be displayed on display terminal 90. In addition, the license parameter value for the selected license parameter is extracted from among the decrypted license parameter set at block 246. At block 248, the monitoring apparatus controller 97 compares the license parameter value for the selected license parameter to a corresponding real-time parameter value of the gaming system 10. If the corresponding real-time parameter value exceeds the license parameter value at block 250, then a message indicating that the license parameter value has been exceeded, for example a "license exceeded" message may be displayed on display terminal 90 at block 252. In addition, the monitoring apparatus controller 97 may prevent the operator/licensee from reconfiguring the physical or operational configuration sought to be controlled by the license parameter value for the selected license parameter at block 256 until such time as an upgraded license allowing the reconfiguration is obtained. If the corresponding real-time parameter value does not exceed the license parameter value at block 250, then a message indicating that the license parameter value has not been exceeded, for example a "license not exceeded" message may be displayed on display terminal 90. In addition, the monitoring apparatus controller 97 will allow the operator/ licensee to reconfigure or add to the physical or operational configuration sought to be controlled by the license parameter value for the selected license parameter at block 254.

Figure 6:
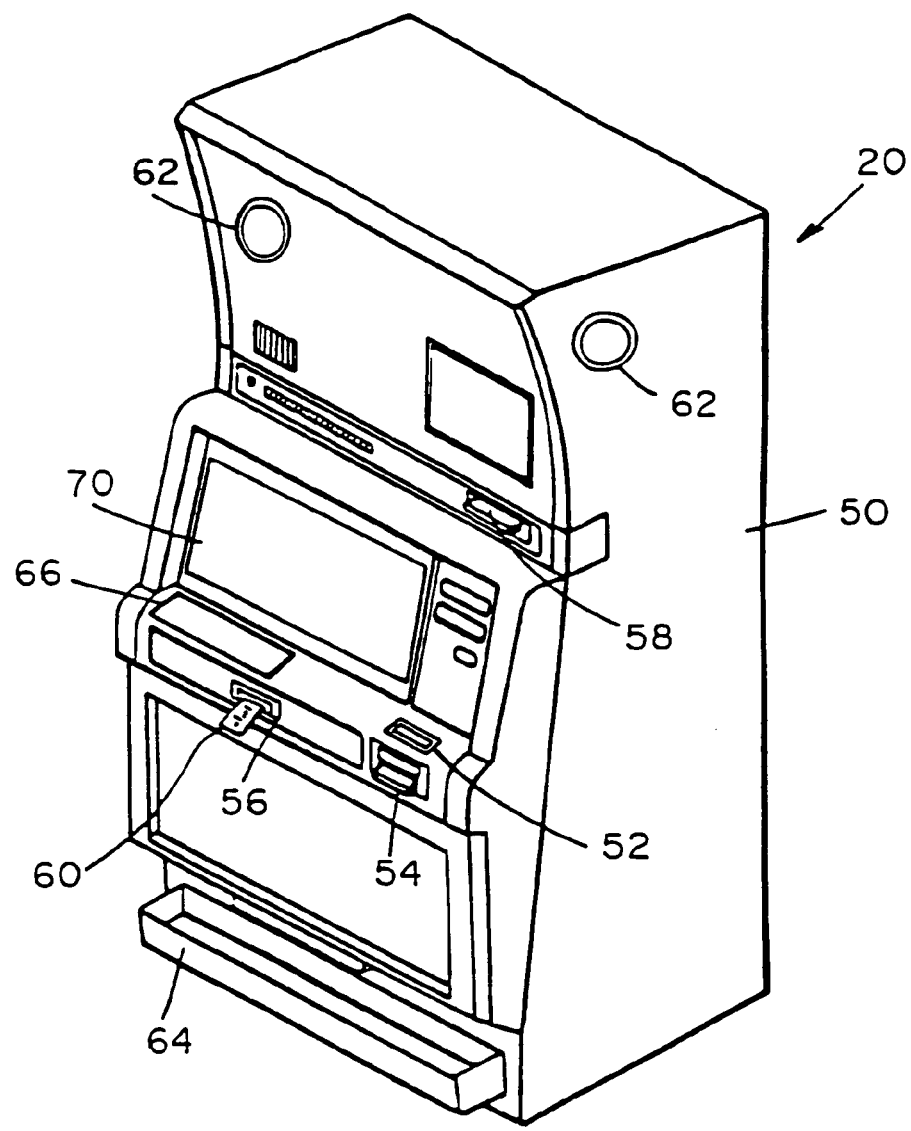
FIG. 6 is a perspective view of an embodiment of one of the gaming units shown schematically in FIG. 1.

FIG. 6 is a perspective view of one possible embodiment of one or more of the gaming units 20. Although the following description addresses the design of the gaming units 20, it should be understood that the gaming units 30 may have the same design as the gaming units 20 described below. It should be understood that the design of one or more of the gaming units 20 may be different than the design of other gaming units 20, and that the design of one or more of the gaming units 30 may be different than the design of other gaming units 30. Each gaming unit 20 may be any type of casino gaming unit and may have various different structures and methods of operation. For exemplary purposes, various designs of the gaming units 20 are described below, but it should be understood that numerous other designs may be utilized.

Referring to FIG. 6, the casino gaming unit 20 may include a housing or cabinet 50 and one or more input devices, which may include a coin slot or acceptor 52, a paper currency acceptor 54, a ticket reader/printer 56 and a card reader 58, which may be used to input value to the gaming unit 20. A value input device may include any device that can accept value from a customer. As used herein, the term "value" may encompass gaming tokens, coins, paper currency, ticket vouchers, credit or debit cards, and any other object representative of value.

If provided on the gaming unit 20, the ticket reader/printer 56 may be used to read and/or print or otherwise encode ticket vouchers 60. The ticket vouchers 60 may be composed of paper or another printable or encodable material and may have one or more of the following informational items printed or encoded thereon: the casino name, the type of ticket voucher, a validation number, a bar code with control and/or security data, the date and time of issuance of the ticket voucher, redemption instructions and restrictions, a description of an award, and any other information that may be necessary or desirable. Different types of ticket vouchers 60 could be used, such as bonus ticket vouchers, cash-redemption ticket vouchers, casino chip ticket vouchers, extra game play ticket vouchers, merchandise ticket vouchers, restaurant ticket vouchers, show ticket vouchers, etc. The ticket vouchers 60 could be printed with an optically readable material such as ink, or data on the ticket vouchers 60 could be magnetically encoded. The ticket reader/printer 56 may be provided with the ability to both read and print ticket vouchers 60, or it may be provided with the ability to only read or only print or encode ticket vouchers 60. In the latter case, for example, some of the gaming units 20 may have ticket printers 56 that may be used to print ticket vouchers 60, which could then be used by a player in other gaming units 20 that have ticket readers 56.

If provided, the card reader 58 may include any type of card reading device, such as a magnetic card reader or an optical card reader, and may be used to read data from a card offered by a player, such as a credit card or a player tracking card. If provided for player tracking purposes, the card reader 58 may be used to read data from, and/or write data to, player tracking cards that are capable of storing data representing the identity of a player, the identity of a casino, the player's gaming habits, etc.

The gaming unit 20 may include one or more audio speakers 62, a coin payout tray 64, an input control panel 66, and a color video display unit 70 for displaying images relating to the game or games provided by the gaming unit 20. The audio speakers 62 may generate audio representing sounds such as the noise of spinning slot machine reels, a dealer's voice, music, announcements or any other audio related to a casino game. The input control panel 66 may be provided with a plurality of pushbuttons or touch-sensitive areas that may be pressed by a player to select games, make wagers, make gaming decisions, etc.

Figure 6A:
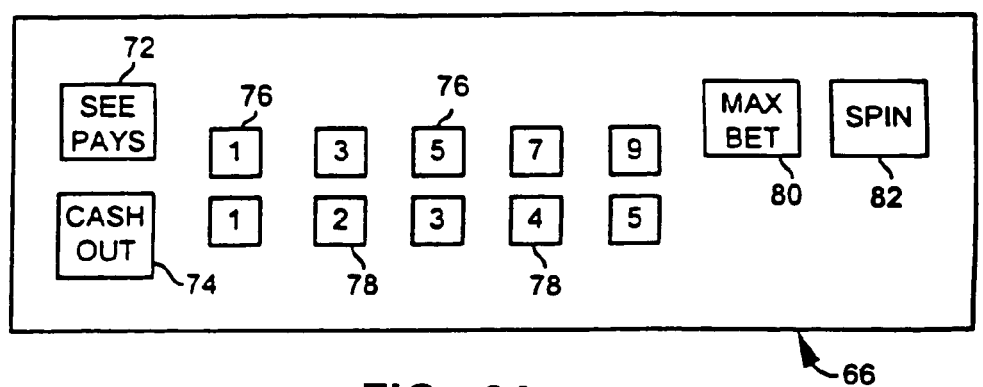
FIG. 6A illustrates an embodiment of a control panel for a gaming unit.

FIG. 6A illustrates one possible embodiment of the control panel 66, which may be used where the gaming unit 20 is a slot machine having a plurality of mechanical or "virtual" reels. Referring to FIG. 6A, the control panel 66 may include a "See Pays" button 72 that, when activated, causes the display unit 70 to generate one or more display screens showing the odds or payout information for the game or games provided by the gaming unit 20. As used herein, the term "button" is intended to encompass any device that allows a player to make an input, such as an input device that must be depressed to make an input selection or a display area that a player may simply touch. The control panel 66 may include a "Cash Out" button 74 that may be activated when a player decides to terminate play on the gaming unit 20, in which case the gaming unit 20 may return value to the player, such as by returning a number of coins to the player via the payout tray 64.

If the gaming unit 20 provides a slots game having a plurality of reels and a plurality of paylines which define winning combinations of reel symbols, the control panel 66 may be provided with a plurality of selection buttons 76, each of which allows the player to select a different number of paylines prior to spinning the reels. For example, five buttons 76 may be provided, each of which may allow a player to select one, three, five, seven or nine paylines.

If the gaming unit 20 provides a slots game having a plurality of reels, the control panel 66 may be provided with a plurality of selection buttons 78 each of which allows a player to specify a wager amount for each payline selected. For example, if the smallest wager accepted by the gaming unit 20 is a quarter ($0.25), the gaming unit 20 may be provided with five selection buttons 78, each of which may allow a player to select one, two, three, four or five quarters to wager for each payline selected. In that case, if a player were to activate the "5" button 76 (meaning that five paylines were to be played on the next spin of the reels) and then activate the "3" button 78 (meaning that three coins per payline were to be wagered), the total wager would be $3.75 (assuming the minimum bet was $0.25).

The control panel 66 may include a "Max Bet" button 80 to allow a player to make the maximum wager allowable for a game. In the above example, where up to nine paylines were provided and up to five quarters could be wagered for each payline selected, the maximum wager would be 45 quarters, or $11.25. The control panel 66 may include a spin button 82 to allow the player to initiate spinning of the reels of a slots game after a wager has been made.

In FIG. 6A, a rectangle is shown around the buttons 72, 74, 76, 78, 80, 82. It should be understood that the rectangle simply designates, for ease of reference, an area in which the buttons 72, 74, 76, 78, 80, 82 may be located. Consequently, the term "control panel" should not be construed to imply that a panel or plate separate from the housing 50 of the gaming unit 20 is required, and the term "control panel" may encompass a plurality or grouping of player activatable buttons.

Although one possible control panel 66 is described above, it should be understood that different buttons could be utilized in the control panel 66, and that the particular buttons used may depend on the game or games that could be played on the gaming unit 20. Although the control panel 66 is shown to be separate from the display unit 70, it should be understood that the control panel 66 could be generated by the display unit 70. In that case, each of the buttons of the control panel 66 could be a colored area generated by the display unit 70, and some type of mechanism may be associated with the display unit 70 to detect when each of the buttons was touched, such as a touch-sensitive screen.

Gaming Unit Electronics

Figure 7:
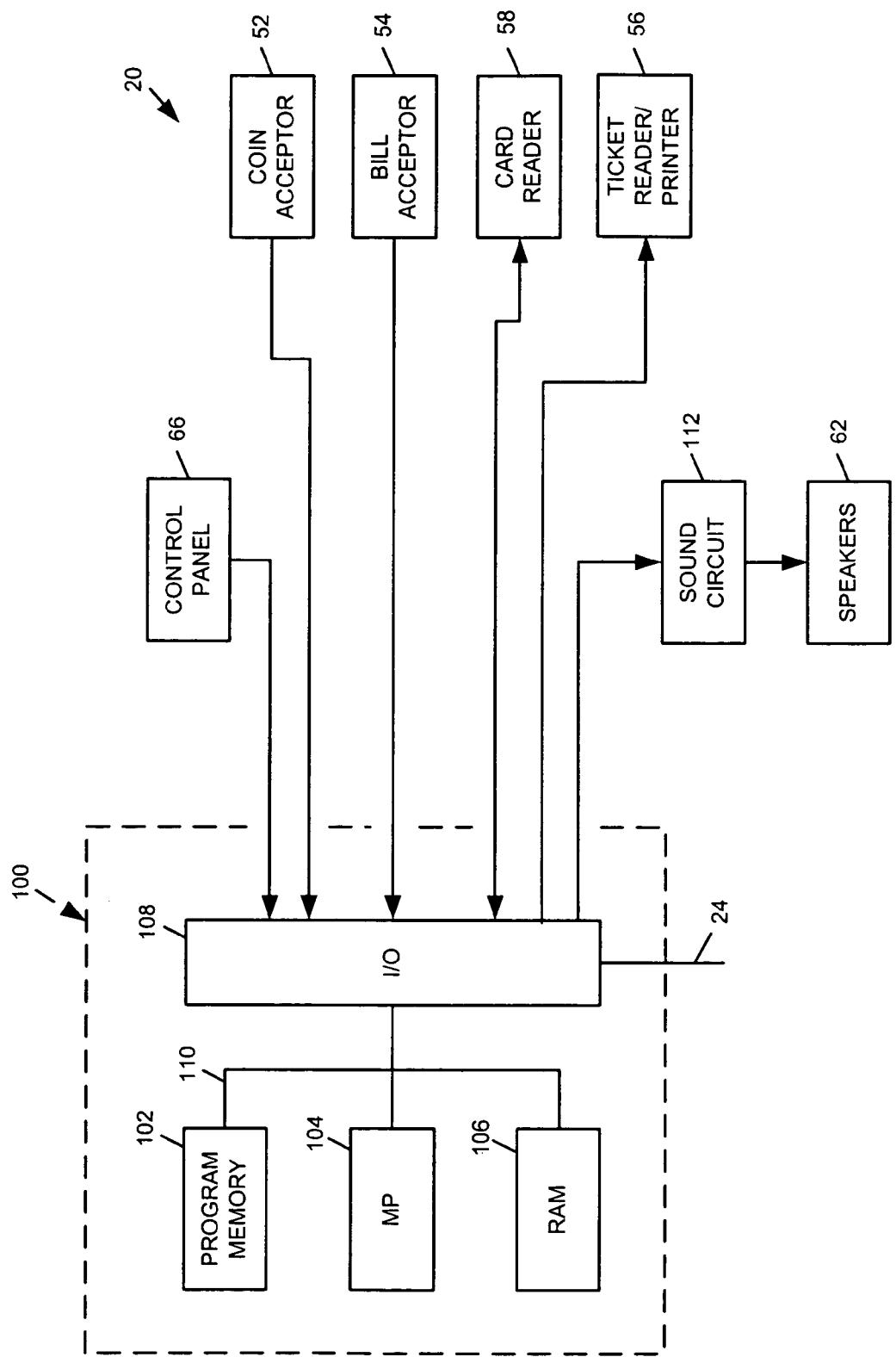
FIG. 7 is a block diagram of the electronic components of the gaming unit of FIG. 6.

FIG. 7 is a block diagram of a number of components that may be incorporated in the gaming unit 20. Referring to FIG. 7, the gaming unit 20 may include a controller 100 that may comprise a program memory 102, a microcontroller or microprocessor (MP) 104, a random-access memory (RAM) 106 and an input/output (I/O) circuit 108, all of which may be interconnected via an address/data bus 110. It should be appreciated that although only one microprocessor 104 is shown, the controller 100 may include multiple microprocessors 104. Similarly, the memory of the controller 100 may include multiple RAMs 106 and multiple program memories 102. Although the I/O circuit 108 is shown as a single block, it should be appreciated that the I/O circuit 108 may include a number of different types of I/O circuits. The RAM(s) 104 and program memories 102 may be implemented as semiconductor memories, magnetically readable memories, and/or optically readable memories, for example.

FIG. 7 illustrates that the control panel 66. the coin acceptor 52, the bill acceptor 54, the card reader 58 and the ticket reader/printer 56 may be operatively coupled to the I/O circuit 108, each of those components being so coupled by either a unidirectional or bidirectional, single-line or multiple-line data link, which may depend on the design of the component that is used. The speaker(s) 62 may be operatively coupled to a sound circuit 112, that may comprise a voice- and sound-synthesis circuit or that may comprise a driver circuit. The sound-generating circuit 112 may be coupled to the I/O circuit 108.

As shown in FIG. 7, the components 52, 54, 56, 58, 66, 112 may be connected to the I/O circuit 108 via a respective direct line or conductor. Different connection schemes could be used. For example, one or more of the components shown in FIG. 3 may be connected to the I/O circuit 108 via a common bus or other data link that is shared by a number of components. Furthermore, some of the components may be directly connected to the microprocessor 104 without passing through the I/O circuit 108.

Overall Operation of Gaming Unit

One manner in which one or more of the gaming units 20 (and one or more of the gaming units 30) may operate is described below in connection with a number of flowcharts which represent a number of portions or routines of one or more computer programs. which may be stored in one or more of the memories of the controller 100. The computer program(s) or portions thereof may be stored remotely, outside of the gaming unit 20, and may control the operation of the gaming unit 20 from a remote location. Such remote control may be facilitated with the use of a wireless connection, or by an Internet interface that connects the gaming unit 20 with a remote computer (such as the network computer 32) having a memory in which the computer program portions are stored. The computer program portions may be written in any high level language such as C, C+, C++ or the like or any low-level, assembly or machine language. By storing the computer program portions therein, various portions of the memories 102, 106 are physically and/or structurally configured in accordance with computer program instructions.

Figure 8:
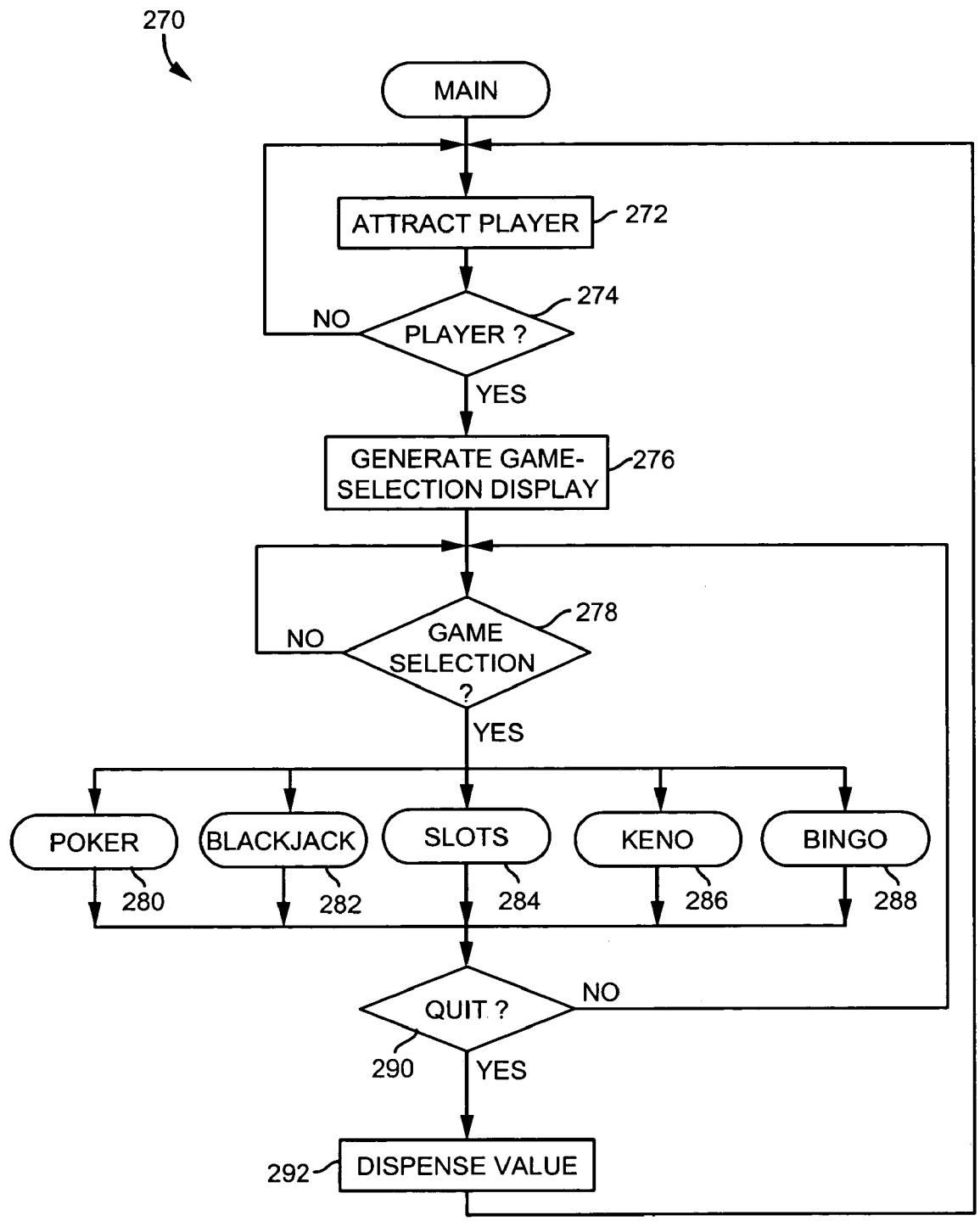
FIG. 8 is a flowchart of an embodiment of a main routine that may be performed during operation of one or more gaming units.

FIG. 8 is a flowchart of a main operating routine 270 that may be stored in the memory of the controller 100. Referring to FIG. 8, the main routine 270 may begin operation at block 272 during which an attraction sequence may be performed in an attempt to induce a potential player in a casino to play the gaming unit 20. The attraction sequence may be performed by displaying one or more video images on the display unit 70 and/or causing one or more sound segments, such as voice or music, to be generated via the speakers 62. The attraction sequence may include a scrolling list of games that may be played on the gaming unit 20 and/or video images of various games being played, such as video poker, video blackjack, video slots, video keno, video bingo, etc.

During performance of the attraction sequence, if a potential player makes any input to the gaming unit 20 as determined at block 274, the attraction sequence may be terminated and a game-selection display may be generated on the display unit 70 at block 276 to allow the player to select a game available on the gaming unit 20. The gaming unit 20 may detect an input at block 274 in various ways. For example, the gaming unit 20 could detect if the player presses any button on the gaming unit 20; the gaming unit 20 could determine if the player deposited one or more coins into the gaming unit 20; the gaming unit 20 could determine if player deposited paper currency into the gaming unit; etc.

The game-selection display generated at block 276 may include, for example, a list of video games that may be played on the gaming unit 20 and/or a visual message to prompt the player to deposit value into the gaming unit 20. While the game-selection display is generated, the gaming unit 20 may wait for the player to make a game selection. Upon selection of one of the games by the player as determined at block 278, the controller 100 may cause one of a number of game routines to be performed to allow the selected game to be played. For example, the game routines could include a video poker routine 280, a video blackjack routine 282, a slots routine 284, a video keno routine 286, and a video bingo routine 288. At block 278, if no game selection is made within a given period of time, the operation may branch back to block 202.

After one of the routines 280, 282, 284, 286. 288 has been performed to allow the player to play one of the games, block 290 may be utilized to determine whether the player wishes to terminate play on the gaming unit 20 or to select another game. If the player wishes to stop playing the gaming unit 20, which wish may be expressed, for example, by selecting a "Cash Out" button, the controller 100 may dispense value to the player at block 292 based on the outcome of the game(s) played by the player. The operation may then return to block 272. If the player did not wish to quit as determined at block 290, the routine may return to block 278 where the game-selection display may again be generated to allow the player to select another game.

It should be noted that although five gaming routines are shown in FIG. 8, a different number of routines could be included to allow play of a different number of games. The gaming unit 20 may also be programmed to allow play of different games.

Figure 9:
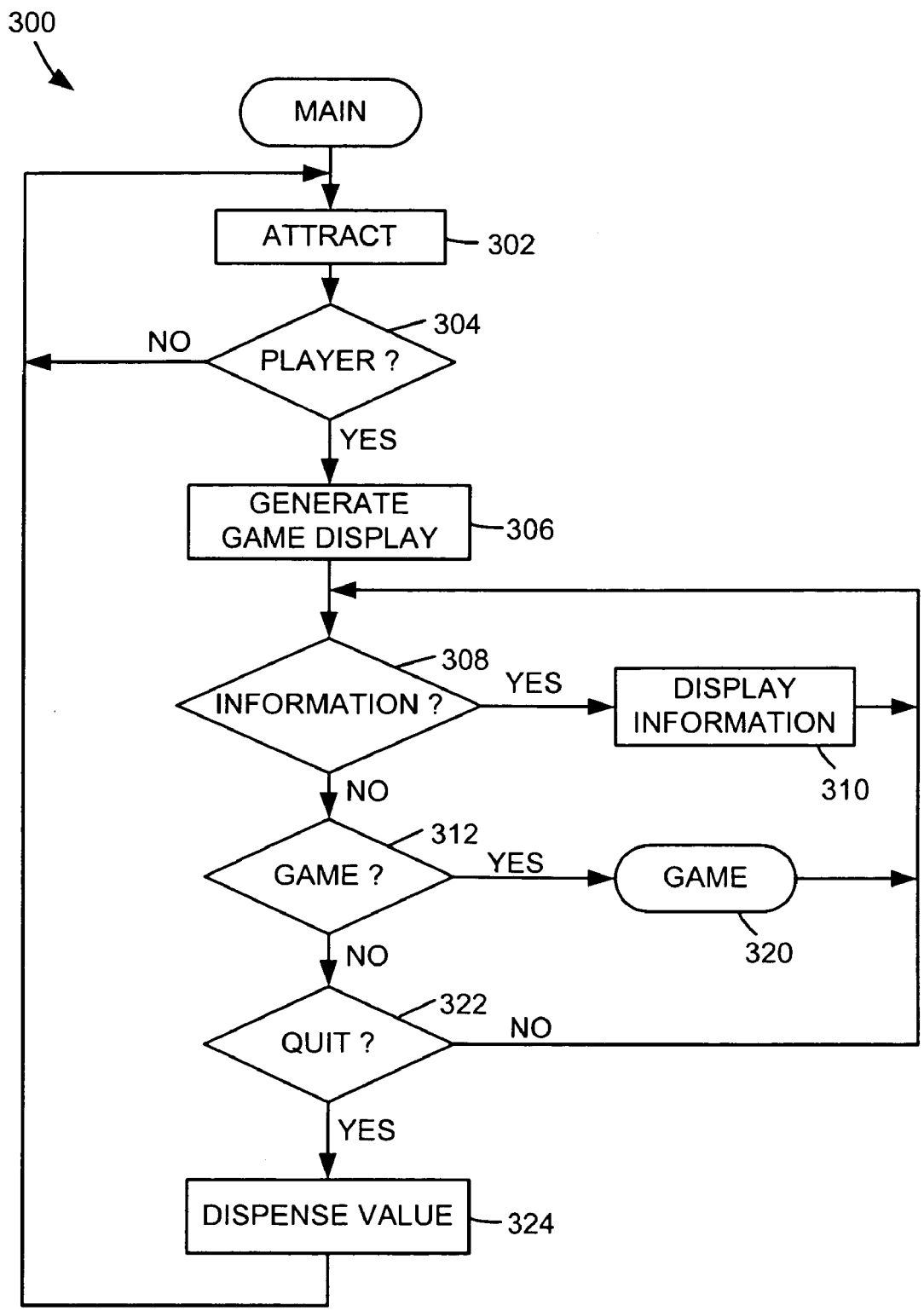
FIG. 9 is a flowchart of an alternate embodiment of a main routine that may be performed during operation of one or more gaming units.

FIG. 9 is a flowchart of an alternative main operating routine 300 that may be stored in the memory of the controller 100. The main routine 300 may be utilized for gaming units 20 that are designed to allow play of only a single game or single type of game. Referring to FIG. 9, the main routine 300 may begin operation at block 302 during which an attraction sequence may be performed in an attempt to induce a potential player in a casino to play the gaming unit 20. The attraction sequence may be performed by displaying one or more video images on the display unit 70 and/or causing one or more sound segments, such as voice or music, to be generated via the speakers 62.

During performance of the attraction sequence, if a potential player makes any input to the gaming unit 20 as determined at block 304, the attraction sequence may be terminated and a game display may be generated on the display unit 70 at block 306. The game display generated at block 306 may include, for example, an image of the casino game that may be played on the gaming unit 20 and/or a visual message to prompt the player to deposit value into the gaming unit 20. At block 308, the gaming unit 20 may determine if the player requested information concerning the game, in which case the requested information may be displayed at block 310. Block 312 may be used to determine if the player requested initiation of a game, in which case a game routine 320 may be performed. The game routine 320 could be any one of the game routines disclosed herein, such as one of the five game routines 280, 282, 284, 286, 288, or another game routine.

After the routine 320 has been performed to allow the player to play the game, block 322 may be utilized to determine whether the player wishes to terminate play on the gaming unit 20. If the player wishes to stop playing the gaming unit 20, which wish may be expressed, for example, by selecting a "Cash Out" button, the controller 100 may dispense value to the player at block 324 based on the outcome of the game(s) played by the player. The operation may then return to block 302. If the player did not wish to quit as determined at block 322, the operation may return to block 308.

Video Poker

Figure 10:
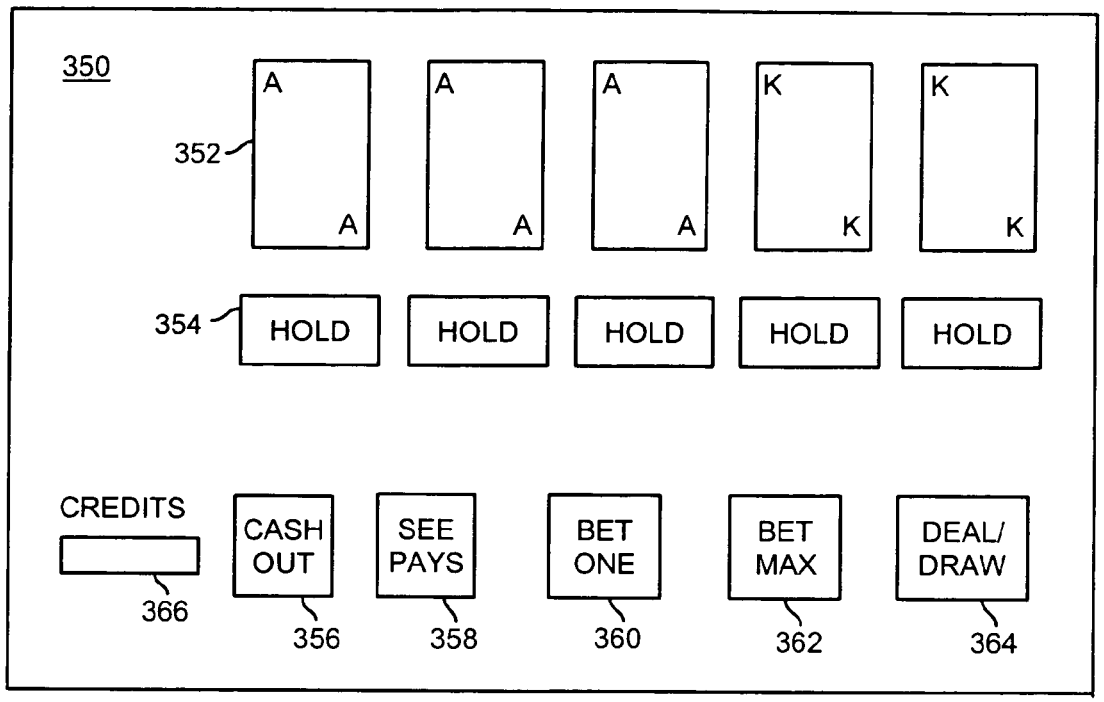
FIG. 10 is an illustration of an embodiment of a visual display that may be displayed during performance of the video poker routine of FIG. 12.

FIG. 10 is an exemplary display 350 that may be shown on the display unit 70 during performance of the video poker routine 280 shown schematically in FIG. 8. Referring to FIG. 10, the display 350 may include video images 352 of a plurality of playing cards representing the player's hand, such as five cards. To allow the player to control the play of the video poker game, a plurality of player-selectable buttons may be displayed. The buttons may include a "Hold" button 354 disposed directly below each of the playing card images 352, a "Cash Out" button 356, a "See Pays" button 358, a "Bet One Credit" button 360, a "Bet Max Credits" button 362, and a "Deal/Draw" button 364. The display 350 may also include an area 366 in which the number of remaining credits or value is displayed. If the display unit 70 is provided with a touch-sensitive screen, the buttons 354, 356, 358, 360, 362, 364 may form part of the video display 350. Alternatively, one or more of those buttons may be provided as part of a control panel that is provided separately from the display unit 70.

Figure 12:
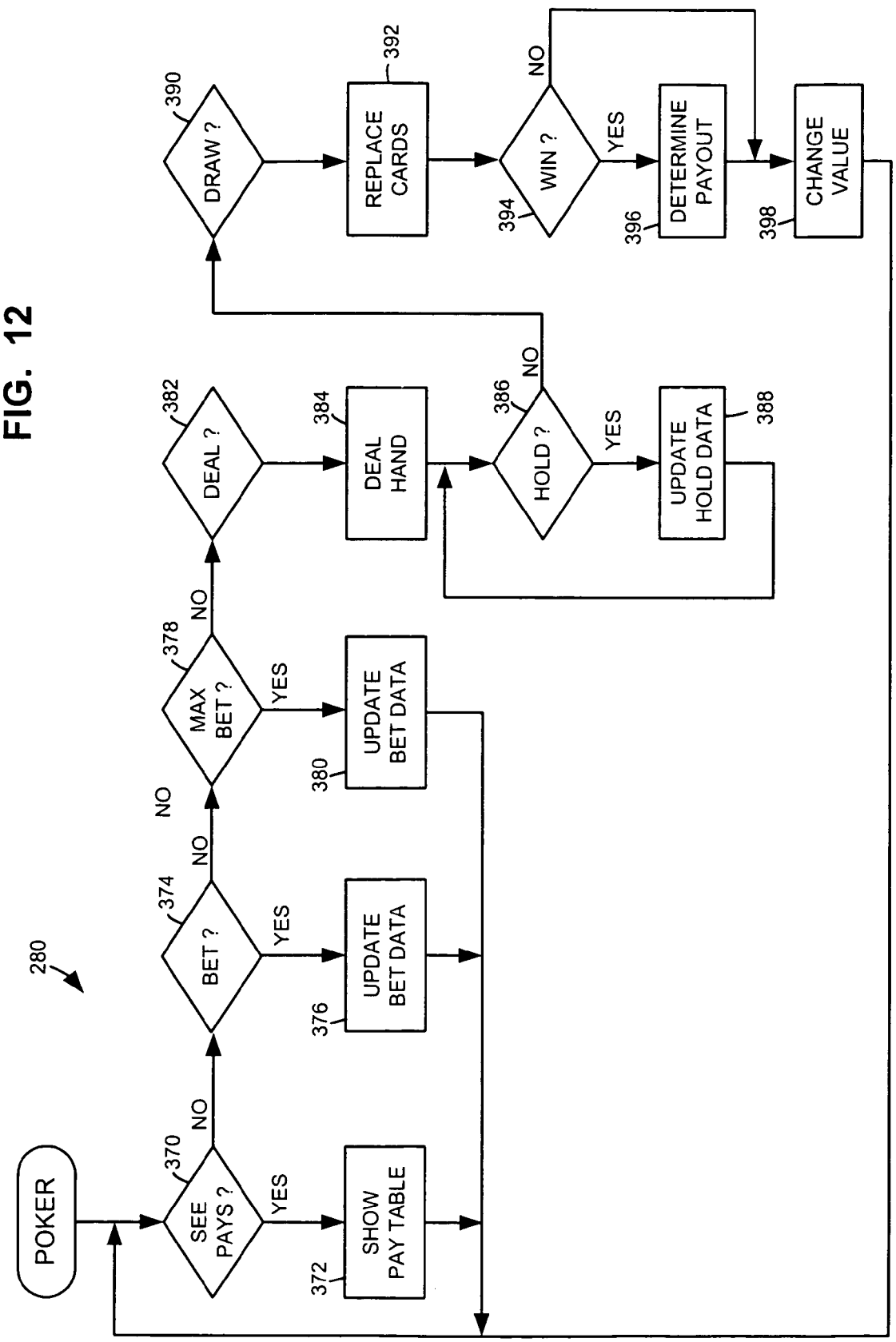
FIG. 12 is a flowchart of an embodiment of a video poker routine that may be performed by one or more of the gaming units.

FIG. 12 is a flowchart of the video poker routine 280 shown schematically in FIG. 8. Referring to FIG. 12, at block 370, the routine may determine whether the player has requested payout information, such as by activating the "See Pays" button 358, in which case at block 372 the routine may cause one or more pay tables to be displayed on the display unit 70. At block 374, the routine may determine whether the player has made a bet, such as by pressing the "Bet One Credit" button 360, in which case at block 376 bet data corresponding to the bet made by the player may be stored in the memory of the controller 100. At block 378, the routine may determine whether the player has pressed the "Bet Max Credits" button 362, in which case at block 380 bet data corresponding to the maximum allowable bet may be stored in the memory of the controller 100.

At block 382, the routine may determine if the player desires a new hand to be dealt, which may be determined by detecting if the "Deal/Draw" button 364 was activated after a wager was made. In that case, at block 384 a video poker hand may be "dealt" by causing the display unit 70 to generate the playing card images 352. After the hand is dealt, at block 386 the routine may determine if any of the "Hold" buttons 354 have been activated by the player, in which case data regarding which of the playing card images 352 are to be "held" may be stored in the controller 100 at block 388. If the "Deal/Draw" button 364 is activated again as determined at block 390, each of the playing card images 352 that was not "held" may be caused to disappear from the video display 350 and to be replaced by a new, randomly selected, playing card image 352 at block 392.

At block 394, the routine may determine whether the poker hand represented by the playing card images 352 currently displayed is a winner. That determination may be made by comparing data representing the currently displayed poker hand with data representing all possible winning hands, which may be stored in the memory of the controller 100. If there is a winning hand, a payout value corresponding to the winning hand may be determined at block 396. At block 398, the player's cumulative value or number of credits may be updated by subtracting the bet made by the player and adding, if the hand was a winner, the payout value determined at block 396. The cumulative value or number of credits may also be displayed in the display area 366 (FIG. 10).

Although the video poker routine 280 is described above in connection with a single poker hand of five cards, the routine 280 may be modified to allow other versions of poker to be played. For example, seven card poker may be played, or stud poker may be played. Alternatively, multiple poker hands may be simultaneously played. In that case, the game may begin by dealing a single poker hand, and the player may be allowed to hold certain cards. After deciding which cards to hold. the held cards may be duplicated in a plurality of different poker hands, with the remaining cards for each of those poker hands being randomly determined.

Video Blackjack

Figure 11:
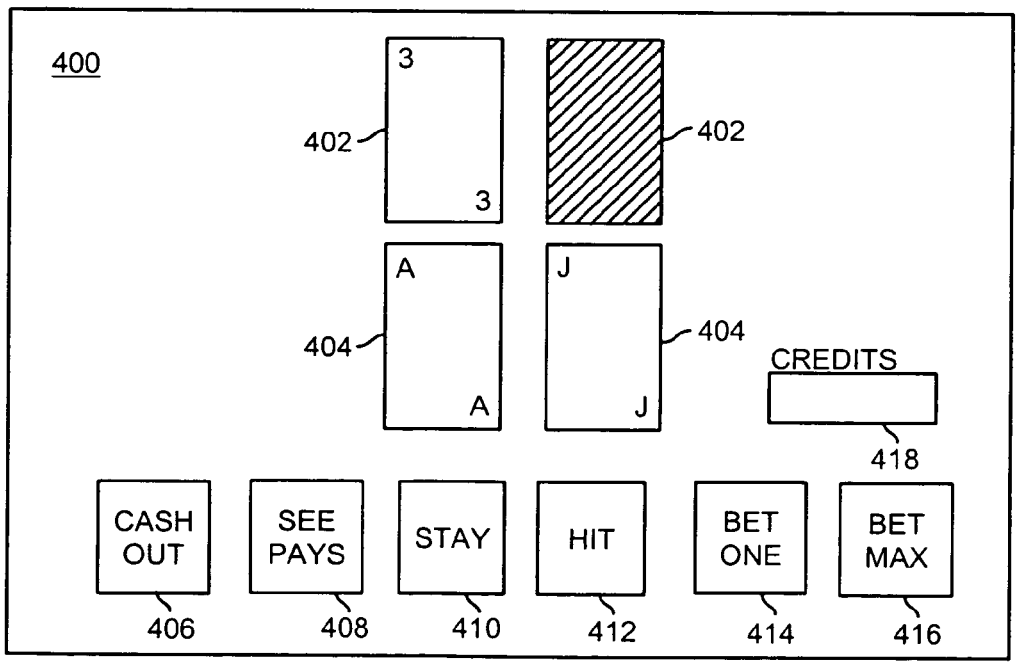
FIG. 11 is an illustration of an embodiment of a visual display that may be displayed during performance of the video blackjack routine of FIG. 13.

FIG. 11 is an exemplary display 400 that may be shown on the display unit 70 during performance of the video blackjack routine 282 shown schematically in FIG. 8. Referring to FIG. 11, the display 400 may include video images 402 of a pair of playing cards representing a dealer's hand, with one of the cards shown face up and the other card being shown face down, and video images 404 of a pair of playing cards representing a player's hand, with both the cards shown face up. The "dealer" may be the gaming unit 20.

To allow the player to control the play of the video blackjack game, a plurality of player-selectable buttons may be displayed. The buttons may include a "Cash Out" button 406, a "See Pays" button 408, a "Stay" button 410, a "Hit" button 412, a "Bet One Credit" button 414, and a "Bet Max Credits" button 416. The display 400 may also include an area 418 in which the number of remaining credits or value is displayed. If the display unit 70 is provided with a touch-sensitive screen, the buttons 406, 408, 410, 412, 414, 416 may form part of the video display 400. Alternatively, one or more of those buttons may be provided as part of a control panel that is provided separately from the display unit 70.

Figure 13:
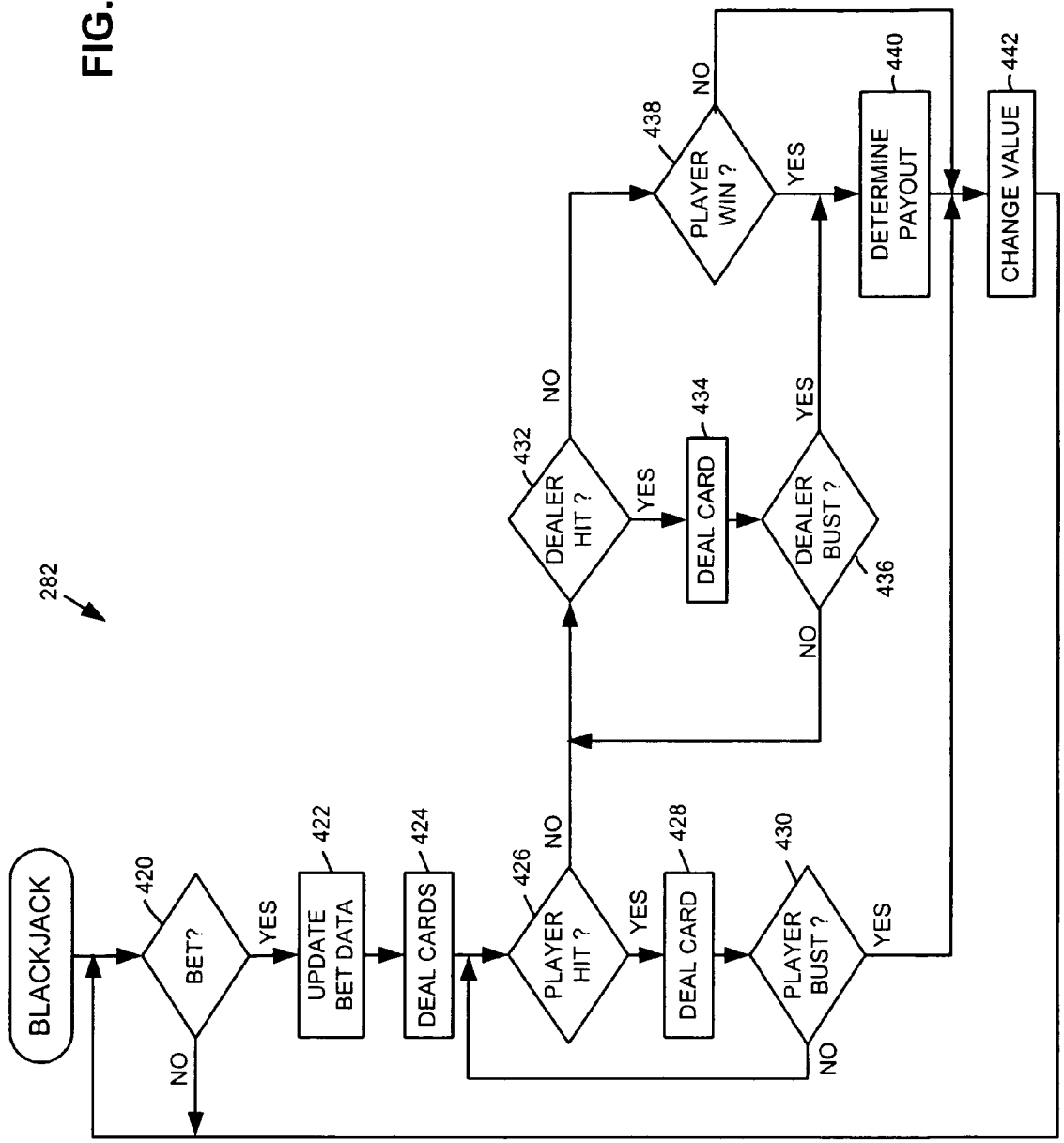
FIG. 13 is a flowchart of an embodiment of a video blackjack routine that may be performed by one or more of the gaming units.

FIG. 13 is a flowchart of the video blackjack routine 282 shown schematically in FIG. 8. Referring to FIG. 13, the video blackjack routine 282 may begin at block 420 where it may determine whether a bet has been made by the player That may be determined, for example, by detecting the activation of either the "Bet One Credit" button 414 or the "Bet Max Credits" button 416. At block 422, bet data corresponding to the bet made at block 420 may be stored in the memory of the controller 100. At block 424, a dealer's hand and a player's hand may be "dealt" by making the playing card images 402, 404 appear on the display unit 70.

At block 426, the player may be allowed to be "hit," in which case at block 428 another card will be dealt to the player's hand by making another playing card image 404 appear in the display 400. If the player is hit, block 430 may determine if the player has "bust," or exceeded 21. If the player has not bust, blocks 426 and 428 may be performed again to allow the player to be hit again.

If the player decides not to hit, at block 432 the routine may determine whether the dealer should be hit. Whether the dealer hits may be determined in accordance with predetermined rules, such as the dealer always hit if the dealer's hand totals 15 or less. If the dealer hits, at block 434 the dealer's hand may be dealt another card by making another playing card image 402 appear in the display 400. At block 436 the routine may determine whether the dealer has bust. If the dealer has not bust, blocks 432, 434 may be performed again to allow the dealer to be hit again.

If the dealer does not hit, at block 436 the outcome of the blackjack game and a corresponding payout may be determined based on, for example, whether the player or the dealer has the higher hand that does not exceed 21. If the player has a winning hand, a payout value corresponding to the winning hand may be determined at block 440. At block 442, the player's cumulative value or number of credits may be updated by subtracting the bet made by the player and adding, if the player won, the payout value determined at block 440. The cumulative value or number of credits may also be displayed in the display area 418 (FIG. 11).

Slots

FIG. 14 is an exemplary display 450 that may be shown on the display unit 70 during performance of the slots routine 284 shown schematically in FIG. 8. Referring to FIG. 14, the display 450 may include video images 452 of a plurality of slot machine reels, each of the reels having a plurality of reel symbols 454 associated therewith. Although the display 450 shows five reel images 452, each of which may have three reel symbols 454 that are visible at a time, other reel configurations could be utilized.

To allow the player to control the play of the slots game, a plurality of player-selectable buttons may be displayed. The buttons may include a "Cash Out" button 456, a "See Pays" button 458, a plurality of payline-selection buttons 460 each of which allows the player to select a different number of paylines prior to "spinning" the reels, a plurality of bet-selection buttons 462 each of which allows a player to specify a wager amount for each payline selected, a "Spin" button 464, and a "Max Bet" button 466 to allow a player to make the maximum wager allowable.

Figure 16:
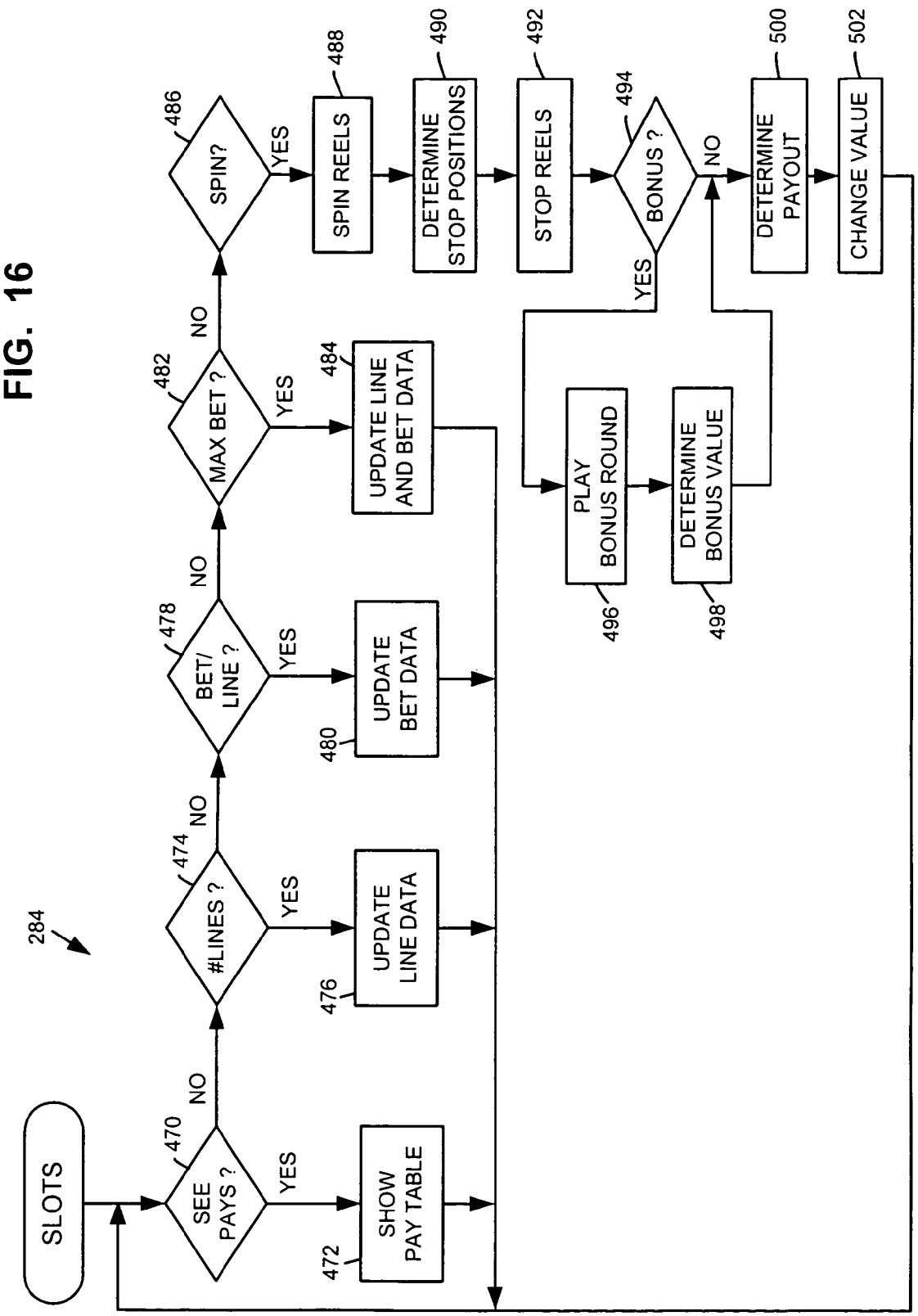
FIG. 16 is a flowchart of an embodiment of a slots routine that may be performed by one or more of the gaming units.

FIG. 16 is a flowchart of the slots routine 284 shown schematically in FIG. 14. Referring to FIG. 16, at block 470, the routine may determine whether the player has requested payout information, such as by activating the "See Pays" button 458, in which case at block 472 the routine may cause one or more pay tables to be displayed on the display unit 70. At block 474, the routine may determine whether the player has pressed one of the payline-selection buttons 460, in which case at block 476 data corresponding to the number of paylines selected by the player may be stored in the memory of the controller 100. At block 478, the routine may determine whether the player has pressed one of the bet-selection buttons 462, in which case at block 480 data corresponding to the amount bet per payline may be stored in the memory of the controller 100. At block 482, the routine may determine whether the player has pressed the "Max Bet" button 466, in which case at block 484 bet data (which may include both payline data and bet-per-payline data) corresponding to the maximum allowable bet may be stored in the memory of the controller 100.

If the "Spin" button 464 has been activated by the player as determined at block 486, at block 488 the routine may cause the slot machine reel images 452 to begin "spinning" so as to simulate the appearance of a plurality of spinning mechanical slot machine reels. At block 490, the routine may determine the positions at which the slot machine reel images will stop, or the particular symbol images 454 that will be displayed when the reel images 452 stop spinning. At block 492, the routine may stop the reel images 452 from spinning by displaying stationary reel images 452 and images of three symbols 454 for each stopped reel image 452. The virtual reels may be stopped from left to right, from the perspective of the player, or in any other manner or sequence.

The routine may provide for the possibility of a bonus game or round if certain conditions are met, such as the display in the stopped reel images 452 of a particular symbol 454. If there is such a bonus condition as determined at block 494, the routine may proceed to block 496 where a bonus round may be played. The bonus round may be a different game than slots, and many other types of bonus games could be provided. If the player wins the bonus round, or receives additional credits or points in the bonus round, a bonus value may be determined at block 498. A payout value corresponding to outcome of the slots game and/or the bonus round may be determined at block 500. At block 502, the player's cumulative value or number of credits may be updated by subtracting the bet made by the player and adding, if the slot game and/or bonus round was a winner, the payout value determined at block 500.

Although the above routine has been described as a virtual slot machine routine in which slot machine reels are represented as images on the display unit 70, actual slot machine reels that are capable of being spun may be utilized instead.

Video Keno

FIG. 15 is an exemplary display 520 that may be shown on the display unit 70 during performance of the video keno routine 286 shown schematically in FIG. 8. Referring to FIG. 15, the display 520 may include a video image 522 of a plurality of numbers that were selected by the player prior to the start of a keno game and a video image 524 of a plurality of numbers randomly selected during the keno game. The randomly selected numbers may be displayed in a grid pattern.

To allow the player to control the play of the keno game, a plurality of player-selectable buttons may be displayed. The buttons may include a "Cash Out" button 526, a "See Pays" button 528, a "Bet One Credit" button 530, a "Bet Max Credits" button 532, a "Select Ticket" button 534, a "Select Number" button 536, and a "Play" button 538. The display 520 may also include an area 540 in which the number of remaining credits or value is displayed. If the display unit 70 is provided with a touch-sensitive screen, the buttons may form part of the video display 520. Alternatively, one or more of those buttons may be provided as part of a control panel that is provided separately from the display unit 70.

Figure 17:
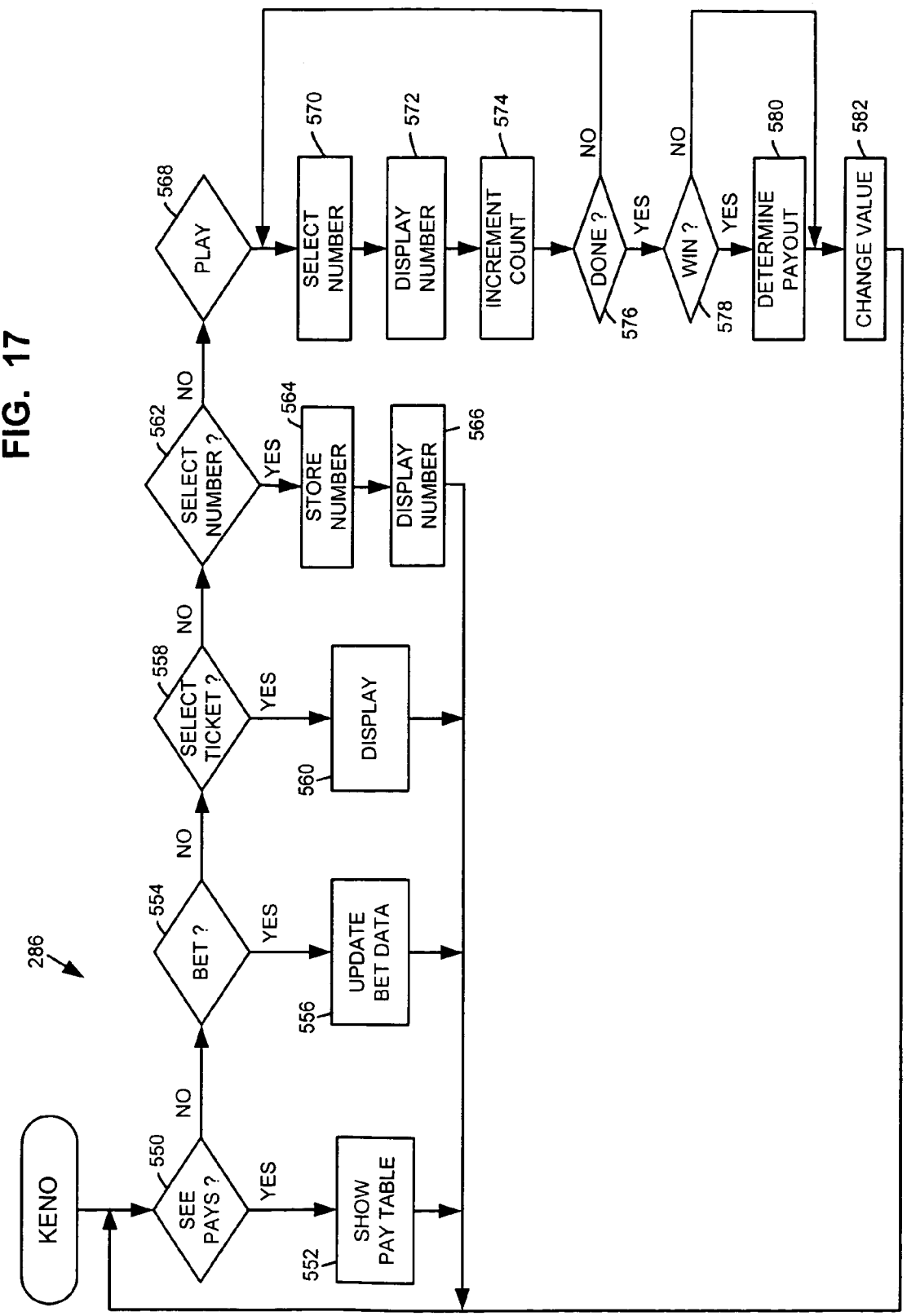
FIG. 17 is a flowchart of an embodiment of a video keno routine that may be performed by one or more of the gaming units.

FIG. 17 is a flowchart of the video keno routine 286 shown schematically in FIG. 8. The keno routine 286 may be utilized in connection with a single gaming unit 20 where a single player is playing a keno game, or the keno routine 286 may be utilized in connection with multiple gaming units 20 where multiple players are playing a single keno game. In the latter case, one or more of the acts described below may be performed either by the controller 100 in each gaming unit or by the network computer 32 to which multiple gaming units 20 are operatively connected.

Referring to FIG. 17, at block 550, the routine may determine whether the player has requested payout information, such as by activating the "See Pays" button 528, in which case at block 552 the routine may cause one or more pay tables to be displayed on the display unit 70. At block 554, the routine may determine whether the player has made a bet, such as by having pressed the "Bet One Credit" button 530 or the "Bet Max Credits" button 532, in which case at block 556 bet data corresponding to the bet made by the player may be stored in the memory of the controller 100. After the player has made a wager, at block 558 the player may select a keno ticket, and at block 560 the ticket may be displayed on the display 520. At block 562, the player may select one or more game numbers, which may be within a range set by the casino. After being selected, the player's game numbers may be stored in the memory of the controller 100 at block 564 and may be included in the image 522 on the display 520 at block 566. After a certain amount of time, the keno game may be closed to additional players (where a number of players are playing a single keno game using multiple gambling units 20).

If play of the keno game is to begin as determined at block 568, at block 570 a game number within a range set by the casino may be randomly selected either by the controller 100 or a central computer operatively connected to the controller, such as the network computer 32. At block 572, the randomly selected game number may be displayed on the display unit 70 and the display units 70 of other gaming units 20 (if any) which are involved in the same keno game. At block 574, the controller 100 (or the central computer noted above) may increment a count which keeps track of how many game numbers have been selected at block 570.

At block 576, the controller 100 (or the network computer 32) may determine whether a maximum number of game numbers within the range have been randomly selected. If not, another game number may be randomly selected at block 570. If the maximum number of game numbers has been selected, at block 578 the controller 100 (or a central computer) may determine whether there are a sufficient number of matches between the game numbers selected by the player and the game numbers selected at block 570 to cause the player to win. The number of matches may depend on how many numbers the player selected and the particular keno rules being used.

If there are a sufficient number of matches, a payout may be determined at block 580 to compensate the player for winning the game. The payout may depend on the number of matches between the game numbers selected by the player and the game numbers randomly selected at block 570. At block 582, the player's cumulative value or number of credits may be updated by subtracting the bet made by the player and adding, if the keno game was won, the payout value determined at block 580. The cumulative value or number of credits may also be displayed in the display area 540 (FIG. 15).

Video Bingo

Figure 18:
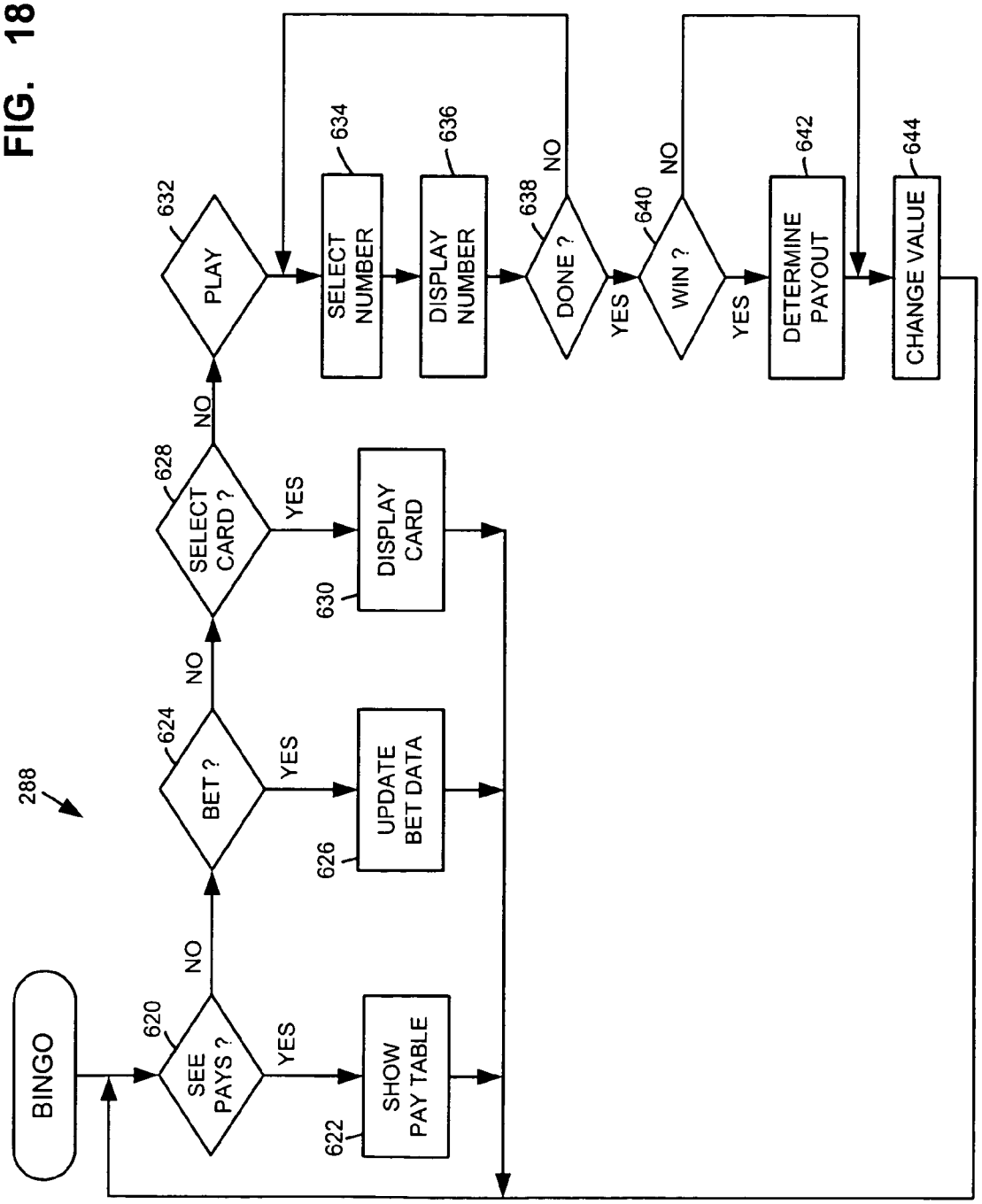
FIG. 18 is an illustration of an embodiment of a visual display that may be displayed during performance of the video bingo routine of FIG. 19.

FIG. 18 is an exemplary display 600 that may be shown on the display unit 70 during performance of the video bingo routine 228 shown schematically in FIG. 8. Referring to FIG. 18, the display 600 may include one or more video images 602 of a bingo card and images of the bingo numbers selected during the game. The bingo card images 602 may have a grid pattern.

To allow the player to control the play of the bingo game, a plurality of player-selectable buttons may be displayed. The buttons may include a "Cash Out" button 604, a "See Pays" button 606, a "Bet One Credit" button 608, a "Bet Max Credits" button 610, a "Select Card" button 612, and a "Play" button 614. The display 600 may also include an area 616 in which the number of remaining credits or value is displayed. If the display unit 70 is provided with a touch-sensitive screen, the buttons may form part of the video display 600. Alternatively, one or more of those buttons may be provided as part of a control panel that is provided separately from the display unit 70.

Figure 19:
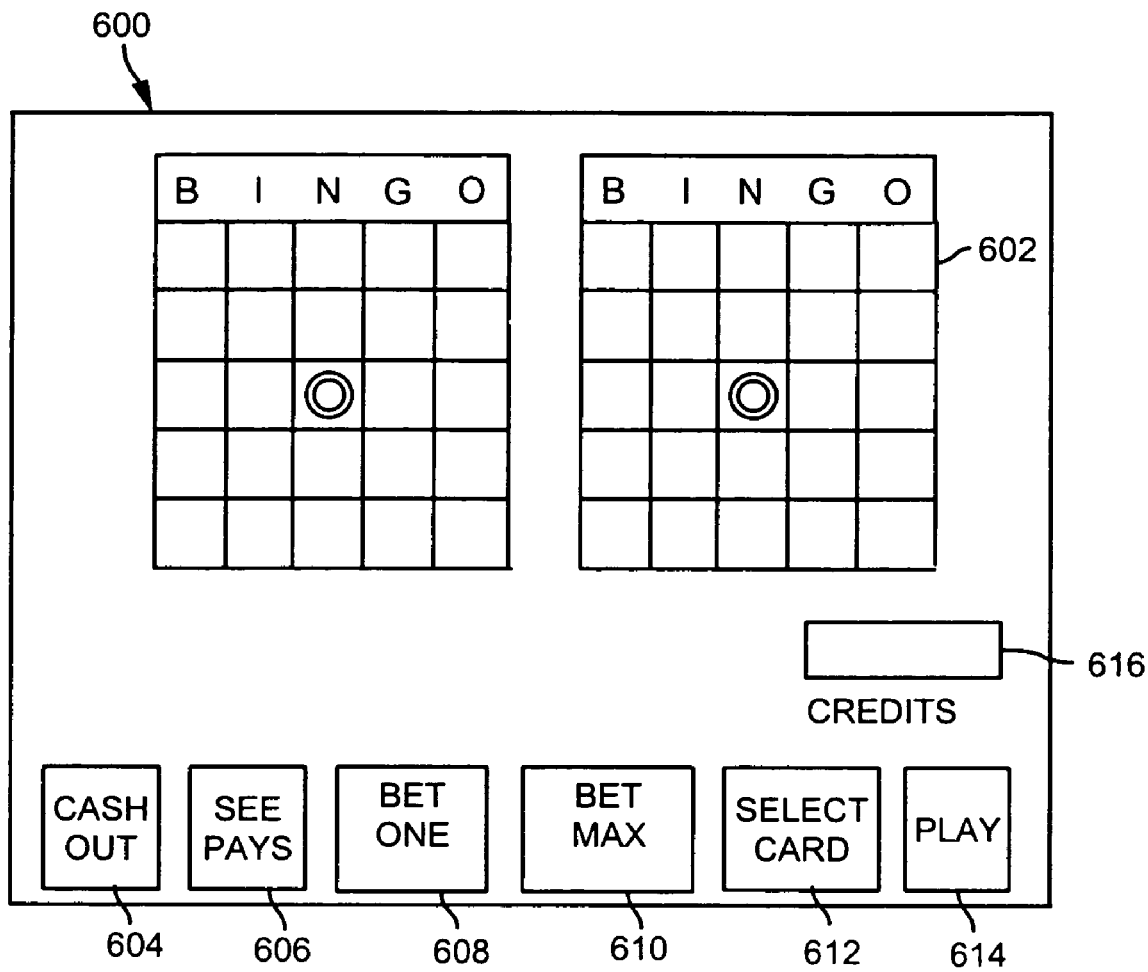
FIG. 19 is a flowchart of an embodiment of a video bingo routine that may be performed by one or more of the gaming units.

FIG. 19 is a flowchart of the video bingo routine 288 shown schematically in FIG. 8. The bingo routine 288 may be utilized in connection with a single gaming unit 20 where a single player is playing a bingo game, or the bingo routine 228 may be utilized in connection with multiple gaming units 20 where multiple players are playing a single bingo game. In the latter case, one or more of the acts described below may be performed either by the controller 100 in each gaming unit 20 or by the network computer 32 to which multiple gaming units 20 are operatively connected Referring to FIG. 19, at block 620, the routine may determine whether the player has requested payout information. such as by activating the "See Pays" button 606, in which case at block 622 the routine may cause one or more pay tables to be displayed on the display unit 70. At block 624, the routine may determine whether the player has made a bet. such as by having pressed the "Bet One Credit" button 608 or the "Bet Max Credits" button 610, in which case at block 626 bet data corresponding to the bet made by the player may be stored in the memory of the controller 100.

After the player has made a wager, at block 628 the player may select a bingo card, which may be generated randomly. The player may select more than one bingo card, and there may be a maximum number of bingo cards that a player may select. After play is to commence as determined at block 632, at block 634 a bingo number may be randomly generated by the controller 100 or a central computer such as the network computer 32. At block 636, the bingo number may be displayed on the display unit 70 and the display units 70 of any other gaming units 20 involved in the bingo game At block 638, the controller 100 (or a central computer) may determine whether any player has won the bingo game. If no player has won, another bingo number may be randomly selected at block 634. If any player has bingo as determined at block 638, the routine may determine at block 640 whether the player playing that gaming unit 20 was the winner. If so, at block 642 a payout for the player may be determined. The payout may depend on the number of random numbers that were drawn before there was a winner, the total number of winners (if there was more than one player), and the amount of money that was wagered on the game. At block 644, the player's cumulative value or number of credits may be updated by subtracting the bet made by the player and adding, if the bingo game was won, the payout value determined at block 642. The cumulative value or number of credits may also be displayed in the display area 616 (FIG. 18).

What is claimed is:

1. A gaming system comprising:
    a plurality of gaming units coupled to a data network, each gaming unit having a configuration for executing a game application enabling a player to play a game of chance on the gaming unit, a configuration of the gaming system defined by the plurality of gaming unit configurations;
    a memory device storing a license parameter paired with a corresponding license parameter value of a license for determining access to the gaming system configuration, the license applicable to the plurality of gaming units;
    a monitoring apparatus separate from the gaming units and including the memory device, the monitoring apparatus coupled to the data network to monitor the plurality of gaming units, the monitoring apparatus including a processor programmed to:
        i) compare a real-time parameter value with the license parameter value, the real-time parameter value determined from a current configuration of the plurality of gaming unit configurations,
        ii) determine that the gaming system configuration is not in compliance with the license when the real-time parameter exceeds the license parameter value, and
        iii) when the gaming system configuration is not in compliance with the license, prevent reconfiguration of the gaming system configuration without interrupting game play on the gaming units.

2. The gaming system of claim 1, wherein the gaming system configuration includes a function of the gaming system.

3. The gaming system of claim 1, wherein the gaming system configuration includes a function of a device coupled to the data network.

4. The gaming system of claim 1, wherein the monitoring apparatus continuously receives data from the plurality of gaming units.

5. The gaming system of claim 1, wherein the monitoring apparatus further includes a display coupled to the processor, the processor further programmed to:
    iv) display a message indicating an exceeded license when the gaming system configuration is not in compliance with the license.

6. The gaming system of claim 1, wherein the monitoring apparatus further includes an input device coupled to the processor, the input device accessible by a gaming system operator.

7. The gaming system of claim 1, wherein preventing reconfiguration of the gaming system configuration without interrupting game play on the gaming units includes preventing an operator from reconfiguring the gaming system configuration.

8. The gaming system of claim 1, wherein the license parameter value is a maximum allowable number of gaming units in the gaming system, and the real-time parameter value is a current number of gaming units coupled to the data network.

9. The gaming system of claim 1, wherein the license parameter value is a valid gaming system operation mode of the gaming system, and the real-time parameter value is a current operation mode of the gaming system.

10. The gaming system of claim 1, wherein the license parameter value is a maximum allowable number of operator workstations that may be incorporated in the gaming system, and the real-time parameter value is a current number of operator workstations coupled to the data network.

11. The gaming system of claim 1, wherein the license parameter value is a maximum allowable number and type of reports that may be generated by the gaming system, and the real-time parameter value is a current number and type of reports being generated by the gaming system.

12. The gaming system of claim 1, wherein the license parameter value is a site identification of the gaming system, and the real-time parameter value is a current site identification incorporated in the gaming system.

13. The gaming system of claim 1, wherein the license parameter value is an expiration date of the license, and the real-time parameter value is a current date of the gaming system.

14. A monitoring apparatus coupled to a data network to monitor a plurality of gaming units coupled to the data network, the monitoring apparatus separate from the gaming units, each gaming unit having a configuration for executing a game application enabling a player to play a game of chance on the gaming unit, a configuration of the gaming system defined by the plurality of gaming unit configurations, the monitoring apparatus comprising:
    a memory device storing a license parameter paired with a corresponding license parameter value of a license for determining access to the gaming system configuration, the license applicable to the plurality of gaming units; and
    a processor programmed to:
        i) compare a real-time parameter value with the license parameter value, the real-time parameter value determined from a current configuration of the plurality of gaming unit configurations,
        ii) determine that the gaming system configuration is not in compliance with the license when the real-time parameter exceeds the license parameter value, and
        iii) when the gaming system configuration is not in compliance with the license, prevent reconfiguration of the gaming system configuration without interrupting game play on the gaming units.

15. The monitoring apparatus of claim 14, wherein the gaming system configuration includes a function of the gaming system.

16. The monitoring apparatus of claim 14, wherein the gaming system configuration includes a function of a device coupled to the data network.

17. The monitoring apparatus of claim 14, wherein the monitoring apparatus continuously receives data from the plurality of gaming units.

18. The monitoring apparatus of claim 14, wherein the monitoring apparatus further includes a display coupled to the processor, the processor further programmed to:
    iv) display a message indicating an exceeded license when the gaming system configuration is not in compliance with the license.

19. The monitoring apparatus of claim 14, wherein the monitoring apparatus further includes an input device coupled to the processor, the input device accessible by a gaming system operator.

20. The monitoring apparatus of claim 14, wherein preventing reconfiguration of the gaming system configuration without interrupting game play on the gaming units includes preventing an operator from reconfiguring the gaming system configuration.

21. The monitoring apparatus of claim 14, wherein the license parameter value is a maximum allowable number of gaming units in the gaming system, and the real-time parameter value is a current number of gaming units coupled to the data network.

22. The monitoring apparatus of claim 14, wherein the license parameter value is a valid gaming system operation mode of the gaming system, and the real-time parameter value is a current operation mode of the gaming system.

23. The monitoring apparatus of claim 14, wherein the license parameter value is a maximum allowable number of operator workstations that may be incorporated in the gaming system, and the real-time parameter value is a current number of operator workstations coupled to the data network.

24. The monitoring apparatus of claim 14, wherein the license parameter value is a maximum allowable number and type of reports that may be generated by the gaming system, and the real-time parameter value is a current number and type of reports being generated by the gaming system.

25. The monitoring apparatus of claim 14, wherein the license parameter value is a site identification of the gaming system, and the real-time parameter value is a current site identification incorporated in the gaming system.

26. The monitoring apparatus of claim 14, wherein the license parameter value is an expiration date of the license, and the real-time parameter value is a current date of the gaming system.

27. In a gaming system including a plurality of gaming units coupled to a data network, each gaming unit having a configuration for executing a game application enabling a player to play a game of chance on the gaming unit, a configuration of the gaming system defined by the plurality of gaming unit configurations, a method comprising the steps of:

providing a memory device storing a license parameter paired with a corresponding license parameter value of a license for determining access to the gaming system configuration, the license applicable to the plurality of gaming units;

providing a monitoring apparatus separate from the gaming units and including the memory device, the monitoring apparatus coupled to the data network to monitor the plurality of gaming units, the monitoring apparatus including a processor programmed to:

i) compare a real-time parameter value with the license parameter value, the real-time parameter value determined from a current configuration of the plurality of gaming unit configurations, ii) determine that the gaming system configuration is not in compliance with the license when the real-time parameter exceeds the license parameter value, and iii) when the gaming system configuration is not in compliance with the license, prevent reconfiguration of the gaming system configuration without interrupting game play on the gaming units.

28. The method of claim 27, wherein the gaming system configuration includes a function of the gaming system.

29. The method of claim 27, wherein the gaming system configuration includes a function of a device coupled to the data network.

30. The method of claim 27, wherein the monitoring apparatus continuously receives data from the plurality of gaming units.

31. The method of claim 27, wherein the monitoring apparatus further includes a display coupled to the processor, the processor further programmed to:

iv) display a message indicating an exceeded license when the gaming system configuration is not in compliance with the license.

32. The method of claim 27, wherein the monitoring apparatus further includes an input device coupled to the processor, the input device accessible by a gaming system operator.

33. The method of claim 27, wherein preventing reconfiguration of the gaming system configuration without interrupting game play on the gaming units includes preventing an operator from reconfiguring the gaming system configuration.

34. The method of claim 27, wherein the license parameter value is a maximum allowable number of gaming units in the gaming system, and the real-time parameter value is a current number of gaming units coupled to the data network.

35. The method of claim 27, wherein the license parameter value is a valid gaming system operation mode of the gaming system, and the real-time parameter value is a current operation mode of the gaming system.

36. The method of claim 27, wherein the license parameter value is a maximum allowable number of operator workstations that may be incorporated in the gaming system, and the real-time parameter value is a current number of operator workstations coupled to the data network.

37. The method of claim 27, wherein the license parameter value is a maximum allowable number and type of reports that may be generated by the gaming system, and the real-time parameter value is a current number and type of reports being generated by the gaming system.

38. The method of claim 27, wherein the license parameter value is a site identification of the gaming system, and the real-time parameter value is a current site identification incorporated in the gaming system.

39. The method of claim 27, wherein the license parameter value is an expiration date of the license, and the real-time parameter value is a current date of the gaming system.

* * * * *